US012750227B2

(12) United States Patent
Kim

(10) Patent No.: US 12,750,227 B2
(45) Date of Patent: Sep. 29, 2026

(54) APPARATUS FOR PROVIDING MONITORING SERVICE OF NEURAL CONSENSUS-BASED BLOCKCHAIN NETWORK SYSTEM TO MANAGE SAFETY QUALITY AND DISTRIBUTION HISTORY, AND OPERATION METHOD THEREOF

(71) Applicant: LEADPOINT SYSTEM INC., Jeonju (KR)

(72) Inventor: Do Hyoung Kim, Namyangju (KR)

(73) Assignee: LEADPOINT SYSTEM INC., Jeonju (KR)

( * ) Notice: Subject to any disclaimer, the term of this patent is extended or adjusted under 35 U.S.C. 154(b) by 28 days.

(21) Appl. No.: 19/174,885

(22) Filed: Apr. 9, 2025

(65) Prior Publication Data

US 2025/0240167 A1 Jul. 24, 2025

Related U.S. Application Data

(63) Continuation of application No. PCT/KR2022/020905, filed on Dec. 20, 2022.

(30) Foreign Application Priority Data

| | | |
|---|---|---|
| Nov. 3, 2022 | (KR) | 10-2022-0145622 |
| Nov. 3, 2022 | (KR) | 10-2022-0145623 |
| Dec. 20, 2022 | (KR) | 10-2022-0179893 |

(51) Int. Cl.
*H04L 9/32* (2006.01)
*H04L 9/00* (2022.01)

(52) U.S. Cl.
CPC .............. *H04L 9/3218* (2013.01); *H04L 9/50* (2022.05)

(58) Field of Classification Search
CPC . H04L 9/3218; H04L 9/50; H04L 9/00; H04L 67/1074
See application file for complete search history.

(56) References Cited

U.S. PATENT DOCUMENTS 8,468,244 B2 * 6/2013 Redlich .................. G06Q 50/18 715/255
2019/0012595 A1 1/2019 Beser
(Continued)

FOREIGN PATENT DOCUMENTS

KR 10-2019-0122149 A 10/2019
KR 10-2020-0114188 A 10/2020
(Continued)

OTHER PUBLICATIONS

Office Action From Korean Patent Office, Oct. 13, 2025.

*Primary Examiner* — Sm A Rahman
(74) *Attorney, Agent, or Firm* — Harvest IP Law, LLP

(57) ABSTRACT

Proposed is an apparatus for providing monitoring service of neural consensus-based blockchain network system to manage safety quality and distribution history and a method of operating the same. The method includes collecting block creation monitoring statistics data corresponding to a neural consensus proof-based blockchain network system from a node device which performs a neural consensus proof-based block creation process in accordance with a preset condition, and providing a real-time monitoring interface configured on the basis of the block creation monitoring statistics data to a user terminal, wherein the neural consensus proof-based block creation process includes extracting effectiveness verification data from new block data, obtaining neural consensus designation information of a next block created on the basis of a random consensus proof process, and
(Continued)

creating the effectiveness verification data of the next block by selectively driving a consensus node functioning unit.

13 Claims, 21 Drawing Sheets

(56) References Cited

U.S. PATENT DOCUMENTS

| | | | | |
|---|---|---|---|---|
| 2020/0026699 | A1 | 1/2020 | Zhang | |
| 2021/0012013 | A1* | 1/2021 | Gourisetti | G06F 16/27 |
| 2023/0110037 | A1* | 4/2023 | Cella | G06F 16/2455<br>700/117 |

FOREIGN PATENT DOCUMENTS

| | | | |
|---|---|---|---|
| KR | 10-2020-0144466 | A | 12/2020 |
| KR | 10-2021-0077176 | A | 6/2021 |
| KR | 10-2022-0094012 | A | 7/2022 |
| WO | 2018-111295 | A1 | 6/2018 |

* cited by examiner

NEURAL CONSENSUS PROOF-BASED NON-COMPETITIVE DECENTRALIZED NEW BLOCK CHAIN NETWORK USING NON-RANDOM CONSENSUS BLOCK CHAIN NETWORK CONSTRUCTED IN POS MANNER, POW MANNER, OR LIKE IS CONSTRUCTED

[DELEGATION REQUEST STEP]

[PREPARING STEP]

[AGREED NEW BLOCK PROPAGATION STEP]

FIG. 18
Auto Refresh
Monitoring Node enid
PARTICIPANT NODE POOL
PARTICIPANT NODE LIST
(Total: 5)
NEURAL CONSENSUS PROOF
Target Block Number
Search
COMMITTEE LIST
(Total: 3)
NEXT SIGNER NODE
NEXT CONGRESS NODE LIST
(Total: 4)

APPARATUS FOR PROVIDING MONITORING SERVICE OF NEURAL CONSENSUS-BASED BLOCKCHAIN NETWORK SYSTEM TO MANAGE SAFETY QUALITY AND DISTRIBUTION HISTORY, AND OPERATION METHOD THEREOF

CROSS REFERENCE TO RELATED APPLICATION(S)

This application is a bypass continuation application claiming benefit of an International Application No. PCT/KR2022/020905 filed on Dec. 20, 2022, claiming priority based on Korean Patent Application No. 10-2022-0145622 filed on Nov. 3, 2022, 10-2022-0145623 filed on Nov. 3, 2022, and 10-2022-0179893 filed on Dec. 20, 2022, the disclosures of which are incorporated herein by reference in its entirety.

BACKGROUND

Technical Field

The present disclosure relates to an apparatus for constructing a blockchain network and a method of operating the apparatus. More specifically, the present disclosure relates to an apparatus for providing monitoring service of neural consensus-based blockchain network system to manage safety quality and distribution history and a method of operating the same.

Description of the Related Art

In general, a blockchain, which is one type of distributed database, uses a peer-to-peer (P2P) network. A distributed database is a technology that makes many users share a large-scale database by physically distributing data. A blockchain is a structure list and network participant node terminals can store data and collectively record and manage master data recording transaction information through verification.

As an example using a blockchain, a blockchain may be formed when node terminals of virtual currency users connected through the internet constitute a P2P network. Accordingly, a block having a transaction history of virtual currencies can be managed at user node terminals, can be connected with a new block, and can be propagated. When a new block is created, a block verified through a consensus algorithm of many participants (node terminals) can be connected with an existing block, and can be confirmed as a final ledger including a transaction history and can be distributed and stored. Further, when a transaction occurs at a participant node terminal, transaction information verified through effectiveness verification of the transaction is propagated to every node terminal. Accordingly, the transaction history, that is, the verified transaction is propagated and distributionally stored, and when some nodes forge data, it is possible to ascertain the truth of the data on the basis of the distributionally stored transaction. The more the users who share data, the more the security stability of a blockchain increases. Blockchains are used in various online services such as a cloud computing service in addition to Bitcoin.

A blockchain technology can enable reduction of transaction costs and anti-tampering of data by changing a centralized data management structure of the related art into a decentralized or distributional type. Such a blockchain technology can create economic values by combining with industries such as finance/medical service/contents/public service/logistics/distribution/energy.

A blockchain enables a node participating in a network to create a block and propagate created block information to other nodes. Further, the nodes receiving new block information can determine and verify consistency of the new block information. In this case, verifying effectiveness of a transaction history that may be included in the new created block, that is, a transaction may also be performed at the node participating in the network.

Further, a consensus algorithm may be applied to a blockchain network to secure integrity of block information constituting a ledger, which is managed by participant nodes, and examine validity of the block information. As the consensus algorithm, Proof of Work (PoW), Proof of Stake (PoS), Delegated Proof of Stake (DPoS), Practical Byzantine Fault Tolerance (PBFT), etc. are generally applied.

Proof-of-Work (PoW) is a method of suppressing illegality by proving that resources (e.g., computing power, etc.) have been input for work. Participant nodes have to necessarily input resources to participate in PoW. Spam, DoS attack, or the like also can succeed only when inputting 51% of more of resources.

PoW needs an eigen hash value to create a block and the eigen hash value is a value that has to be found out by randomly substituting nonce values, so resources such as computing power have to be excessively input to determine such an eigen hash value, costs and an environmental problem are caused by power consumption, and specific function-intensive chips are required, whereby a problem of centralization may be caused due to union of computing power.

In order to solve these problems, Proof-of-Stake (PoS) was proposed and PoS employs a method that can achieve proof in proportion to the holding stakes of nodes. PoS makes the possibility of being able to create a block be proportioned to the stake of tokens of each node. Assuming that the stake of tokens is a resource to be input in PoS, PoS can be considered as one detailed type of PoW. The algorithm formula of PoS can be expressed as 'PoW using a digest'. PoS, in comparison to PoW, hardly consumes energy and makes resource intensiveness difficult.

However, since PoS is a manner that becomes more advantageous as the stake increases, a problem of block creation centralization may be generated due to a stake and nodes may show tendency to only collect tokens and not be reluctant to use the tokens. Further, since the stake reaches 100% at the point in time of a genesis block corresponding to the first block of a blockchain, the person who started the system can make all of the blocks again and again. Since each node also can start again from the point in time as long as it has a stake, tempering cannot be prevented only through PoS.

In order to solve this problem, a method for selecting a consensus node using nonce has been disclosed in Korean Patent Application Publication No. 10-2019-0122149. This manner uses a fair random consensus, so it is not required to use excessive resources like PoW and only some nodes, which are selected as a consensus in accordance with a nonce chain, of all nodes participate in block creation to be able to remove the defect that nodes having a lot of resources monopolize the update right like PoS, thereby having the advantage that consumption of resources is minimized, it is made impossible to guess nodes to obtain the right to create blocks through a nonce proof process and a predetermined number of or more consensus nodes are selected as a probable representative of all of nodes.

Nevertheless, blockchain networks already globally constructed at present such as Bitcoin or Ethereum still use PoW and PoS manners, and Private blockchain network, etc. operate a network in which only a small number of nodes can participate like PBFT to keep efficiency of the amount of communication. Accordingly, even though a new consensus technique is proposed and a new network is constructed, it is very difficult to quickly overcome a waste of resources and social costs caused by the already established extensive existing blockchain networks.

SUMMARY

The present disclosure has been made in an effort to solve the problems described above and an objective of the preset disclosure is to provide: an apparatus that controls existing PoW-type or PoS-type blockchain networks already constructed not to be operated anymore in a PoW or PoS manner and gives support such that a random consensus proof-based blockchain network based on a pre-constructed blockchain network can be operated, by constructing a neural consensus proof module cluster that uses an existing non-random consensus proof-based blockchain network as a random consensus proof-based blockchain network; a method of operating the apparatus; and a new blockchain network system based on the apparatus and method.

Another objective of the preset disclosure is to provide a service apparatus that can help improve easiness and utility in management of the blockchain network system of the present disclosure by providing a monitoring service corresponding to the neural consensus proof module cluster of the blockchain network system, and a method of operating the apparatus.

Meanwhile, an objective of the present disclosure is to provide an apparatus for providing a service to manage safety quality and distribution history on the basis of an intelligent safety distribution platform by using a monitoring service corresponding to a neural consensus proof module cluster of a blockchain network system and a method of operating the same.

In a method of operating an apparatus for providing a service, a method according to an exemplary embodiment of the present disclosure for solving the task described above includes collecting block creation monitoring statistics data corresponding to a neural consensus proof-based blockchain network system from a node device which performs a neural consensus proof-based block creation process in accordance with a preset condition while connected to a non-random consensus proof-based blockchain network of the neural consensus proof-based blockchain network system constructing an intelligent safety distribution platform with a IoT (Internet of Things) sensor collection server connected, and providing a real-time monitoring interface configured on the basis of the block creation monitoring statistics data to a user terminal, wherein the neural consensus proof-based block creation process includes extracting effectiveness verification data from new block data, obtaining neural consensus designation information of a next block created on the basis of a random consensus proof process in accordance with verification processing of the effectiveness verification data, and creating the effectiveness verification data of the next block by selectively driving a consensus node functioning unit on the basis of the neural consensus designation information of the next block.

In an apparatus for providing a service, the apparatus according to an exemplary embodiment of the present disclosure for solving the task described above includes a block creation monitoring statistics data collector for collecting block creation monitoring statistics data corresponding to a neural consensus proof-based blockchain network system from a node device which performs a neural consensus proof-based block creation process in accordance with a preset condition while connected to a non-random consensus proof-based blockchain network of the neural consensus proof-based blockchain network system constructing an intelligent safety distribution platform with a IoT (Internet of Things) sensor collection server connected, and a service provider for providing a real-time monitoring interface configured on the basis of the block creation monitoring statistics data to a user terminal, wherein the neural consensus proof-based block creation process includes extracting effectiveness verification data from new block data, obtaining neural consensus designation information of a next block created on the basis of a random consensus proof process in accordance with verification processing of the effectiveness verification data, and creating the effectiveness verification data of the next block by selectively driving a consensus node functioning unit on the basis of the neural consensus designation information of the next block.

According to an embodiment of the present disclosure, since a neural consensus verification module cluster that uses a non-random consensus proof-based blockchain network as a random consensus proof-based blockchain network is constructed, it is possible to provide a node terminal device forming a network that enables a random consensus proof-based blockchain network based on a pre-constructed blockchain network to be operated while controlling an existing pre-constructed PoW- or PoS-type blockchain network not to be operated anymore in the PoW or PoS manner or to be limitatively operated in accordance with the minimum number of nodes of a Byzantine fault tolerance consensus, and a method of operating the node terminal device.

Accordingly, it is possible to convert the pre-constructed non-random consensus proof-based blockchain network to be used as a random consensus proof-based blockchain network while maximally maintaining the infrastructure and usefulness of the pre-constructed non-random consensus proof-based blockchain network, it is possible to provide an apparatus providing a neural consensus proof-based distributed consensus process that prevents a waste of resources and social costs and is efficient and fair, and a method of operating the apparatus.

Further, according to an embodiment of the present disclosure, it is possible to drive a continuity security mode providing a configuration that performs assistant processing using random consensus proof-based blockchain network only when a disorder condition is generated so that service continuity can be maintained when a disorder is generated in a current non-random consensus proof-based blockchain network, and accordingly, the present disclosure can be used also for securing service continuity of existing services.

Further, according to the preset disclosure, it is possible to provide an apparatus for providing a monitoring service that can help improve easiness and usefulness in management of the blockchain network system of the present disclosure by providing a monitoring service corresponding to the neural consensus proof module cluster of the blockchain network system, and a method of operating the apparatus.

Meanwhile, the present disclosure according to an exemplary embodiment can provide an apparatus for providing a service to manage safety quality and distribution history on the basis of an intelligent safety distribution platform by using a monitoring service corresponding to a neural consensus proof module cluster of a blockchain network system and a method of operating the same.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

The following provides only the principle of the present disclosure. Accordingly, those skilled in the art may implement the principle of the present disclosure and various apparatuses included in the concept and range of the present disclosure which are not clearly described or shown herein though. All conditional terminologies and embodiments described herein should be understood as being definitely intended as an object for understanding the concept of the present disclosure without limiting the specifically stated embodiments and states.

Further, all detailed descriptions enumerate not only the principle, aspects, and embodiments of the present disclosure, but specific embodiments should be understood as being intended to include structural and functional equivalents of those matters. Further, these equivalents should be understood as including all elements designed to perform the same functions regardless of not only equivalents known at present, but equivalents, that is, structures to be developed in the future.

Accordingly, for example, block diagrams of this specification should be understood as showing an exemplary conceptual respect that concretes the principle of the present disclosure. Similarly, all of flowcharts, state conversion diagrams, intention codes, etc. should be understood as showing various processes that can be substantially shown on computer-readable media and are performed by computers and processors regardless of whether a computer or a processor is definitely shown.

Further, definite use of terms proposed as a processor, control, or similar concepts should not be construed by exclusively citing hardware having ability to execute software and should be construed as suggestively including digital signal processor (DSP) hardware, and a ROM, a RAM, and a nonvolatile memory for storing software without limitation. Other well-known and generally used hardware may also be included.

The objectives, features, and advantages of the present disclosure described above will be clearer through the following detailed description relating to the accompanying drawing, so the spirit of the present disclosure would be easily implemented by those skilled in the art. Further, in description of the present disclosure, well-known technologies are not described in detail not to unnecessarily obscure the subject of the present disclosure.

Hereinafter, exemplary embodiments of the present disclosure are described in detail with reference to the accompanying drawings.

Figure 1:
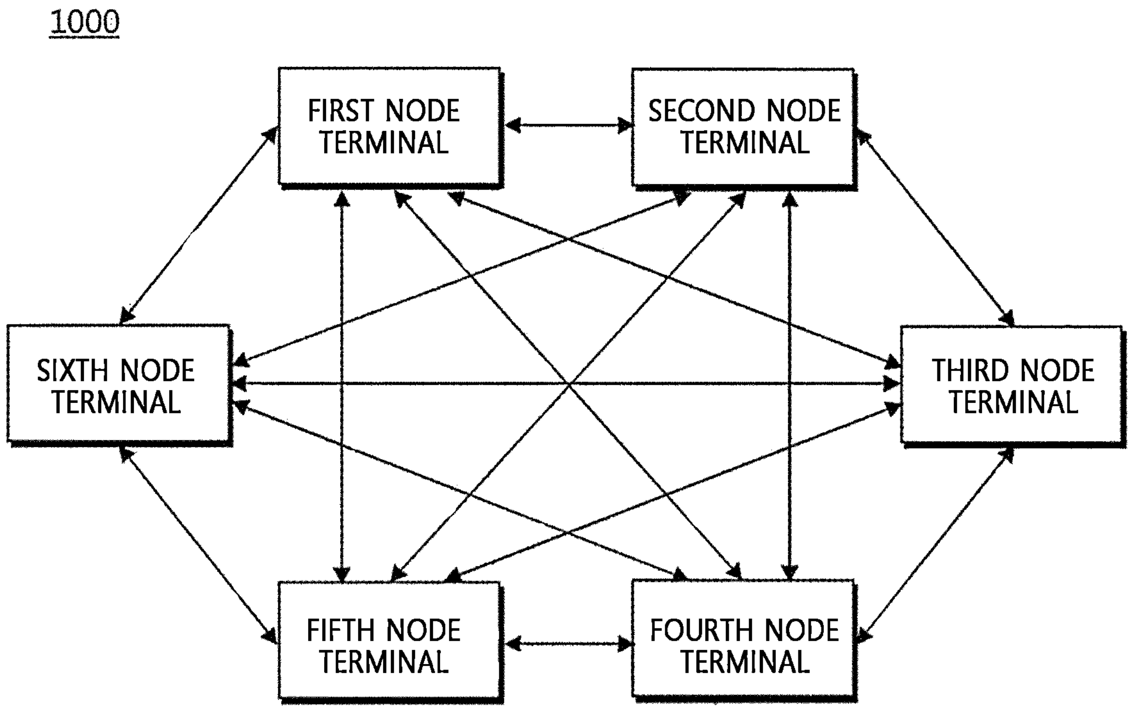
FIG. 1 is a diagram schematically showing an entire system according to an embodiment of the present disclosure.
Figure 2:
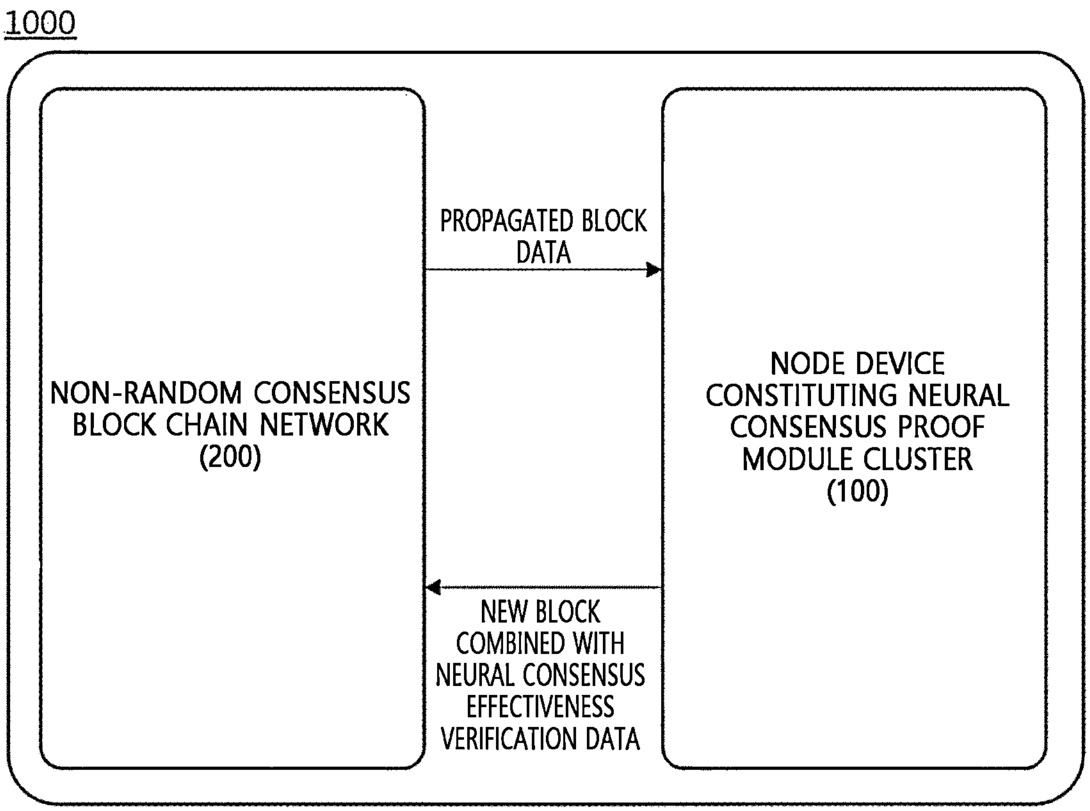
FIG. 2 is a diagram for explaining a blockchain network according to an embodiment of the present disclosure.

FIG. 1 is a diagram schematically showing an entire system according to an embodiment of the present disclosure and FIG. 2 is a diagram for explaining a blockchain network according to an embodiment of the present disclosure.

First, referring to FIG. 1, in a blockchain network system 1000 according to an embodiment of the present disclosure, a blockchain network of mesh-type network topology can be configured by one or more node terminals connected through a wired or wireless network. The node terminals are connected to the blockchain network through I/O devices and can exchange data. The blockchain network system 1000 may include, as the node terminals, various electronic systems such as mobile devices including a mobile phone, a smartphone, a PDA, a tablet computer, a laptop, etc., computing devices including a personal computer, a tablet computer, a netbook, etc., or electronic products including a television, a smart television, a security device for gate control, etc.

Further, the node terminals 100 each may have a communication module for connecting to the blockchain network. The blockchain network, for example, may be implemented as a wired network such as a Local Area Network (LAN), a Wide Area Network (WAN), or a Value Added Network (VAN). Further, the blockchain network may be implemented as all kinds of wireless networks such as a mobile radio communication network, a satellite communication network, Bluetooth, Wireless Broadband Internet (Wibro), High Speed Downlink Packet Access (HSDPA), Wi-Fi, Long Term Evolution (LTE). Depending on necessity, the blockchain network may be a wired-wireless mixed network.

Further, each of the node terminals can register account information according to its node connection in transaction ledger data that are shared in a cloud manner through a network. Further, when there is a need for a transaction of encryption information for creating a blockchain, each trader terminal can propagate transaction information to be recorded in the transaction ledger data to every trader terminal.

Further, the transaction ledger data are updated and the information thereof is shared in accordance with mutual verification processing corresponding to the above process, whereby a transaction of encryption information for creating a blockchain can be made.

In this case, the transaction ledger data can be linked with a blockchain data having a structure in which a plurality of blocks is sequentially connected in order of creation by making each of blocks corresponding to predetermined times or units include a hash value for a block created before a current block. Accordingly, it is possible to easily verify whether the transaction ledger data have been tampered by verifying the hash values of the blockchain.

Security stability of the blockchain can be implemented by participation in the system of sharers who share data. Accordingly, transaction information blocks, which include specifications of sharing between sharer terminals connected to the blockchain network, specifications of issuance/transaction of encryption information for creating the blockchain, etc., can be sequentially stored, and transaction verification processing for sequentially making hash values for anti-tempering thereof into a blockchain can be distributionally performed at the trader terminals.

In such verification processing, as shown in FIG. 2, a pre-constructed blockchain network may be usually a non-random consensus proof-based blockchain network. Representatively, Proof-of-Work (PoW), Proof-of-Stake (PoS), etc. may be the non-random consensus proof-based blockchain network 200, and blockchain networks such as Bitcoin and Ethereum may correspond thereto.

Accordingly, node devices 100 according to an embodiment of the present disclosure can constitute a neural consensus proof module cluster, and the neural consensus proof module cluster can configure a new block combined with neural consensus effectiveness verification data on the basis of random consensus proof manner and can process the configured new block to be propagated through the non-random consensus blockchain network 200.

Accordingly, in the non-random consensus blockchain network 200, the propagated block data are shared again in the network and can be processed such that a next block is created again by the node device 100 configuring the neural consensus proof module cluster. Since specific proof such as PoW and PoW is not required in this process, it is possible to construct a new random consensus blockchain network system 1000 that can implement decentralization in a non-competitive manner.

That is, according to an embodiment of the present disclosure, since the neural consensus proof module cluster that enables the existing non-random consensus proof-based blockchain network 200 to be used as the random consensus proof-based blockchain network 1000 is constructed using the node devices 100, it is possible to provide the node terminal devices 100 forming a network that enables a random consensus proof-based blockchain network based on a pre-constructed blockchain network to be operated while controlling an existing pre-constructed PoW-type or PoS-type blockchain network not to be operated anymore in the PoW or PoS manner or to be limitatively operated in accordance with the minimum number of nodes of a Byzantine fault tolerance consensus.

Accordingly, it is possible to convert the pre-constructed non-random consensus proof-based blockchain network to be used as a random consensus proof-based blockchain network while maximally maintaining the infrastructure and usefulness of the pre-constructed non-random consensus proof-based blockchain network, so it is possible to provide a neural consensus proof-based distributed consensus process that prevents a waste of resources and social costs and is efficient and fair. In this case, a nonce chain and hash checking process configured on the basis of one-time random numbers may be used for participation qualification proof for a random consensus, but this is only an example designation and participation qualification proof of a random consensus can be possible even in various other manners.

Figure 3:
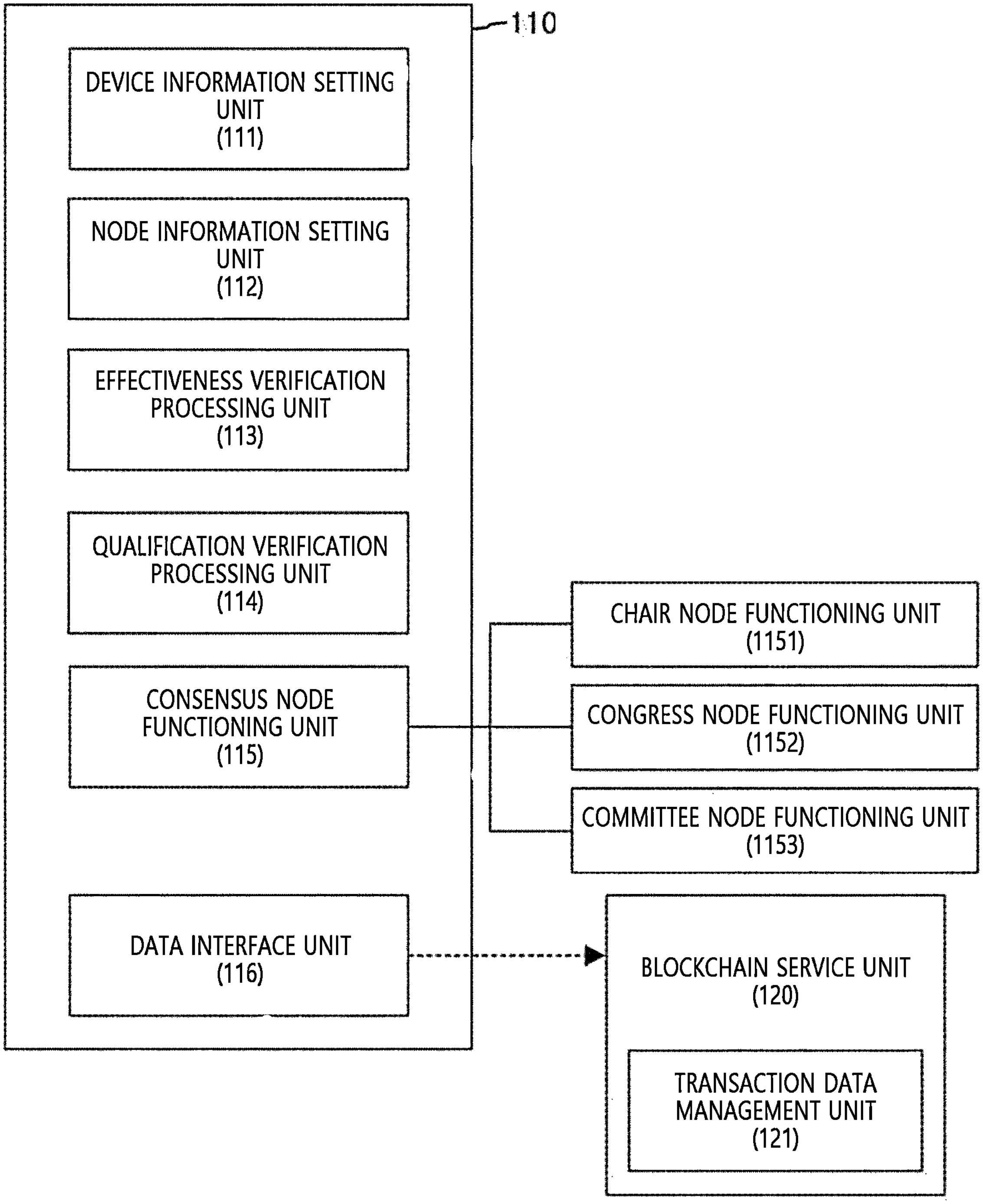
FIG. 3 is a block diagram showing in more detail a node device according to an embodiment of the present disclosure.
Figure 4:
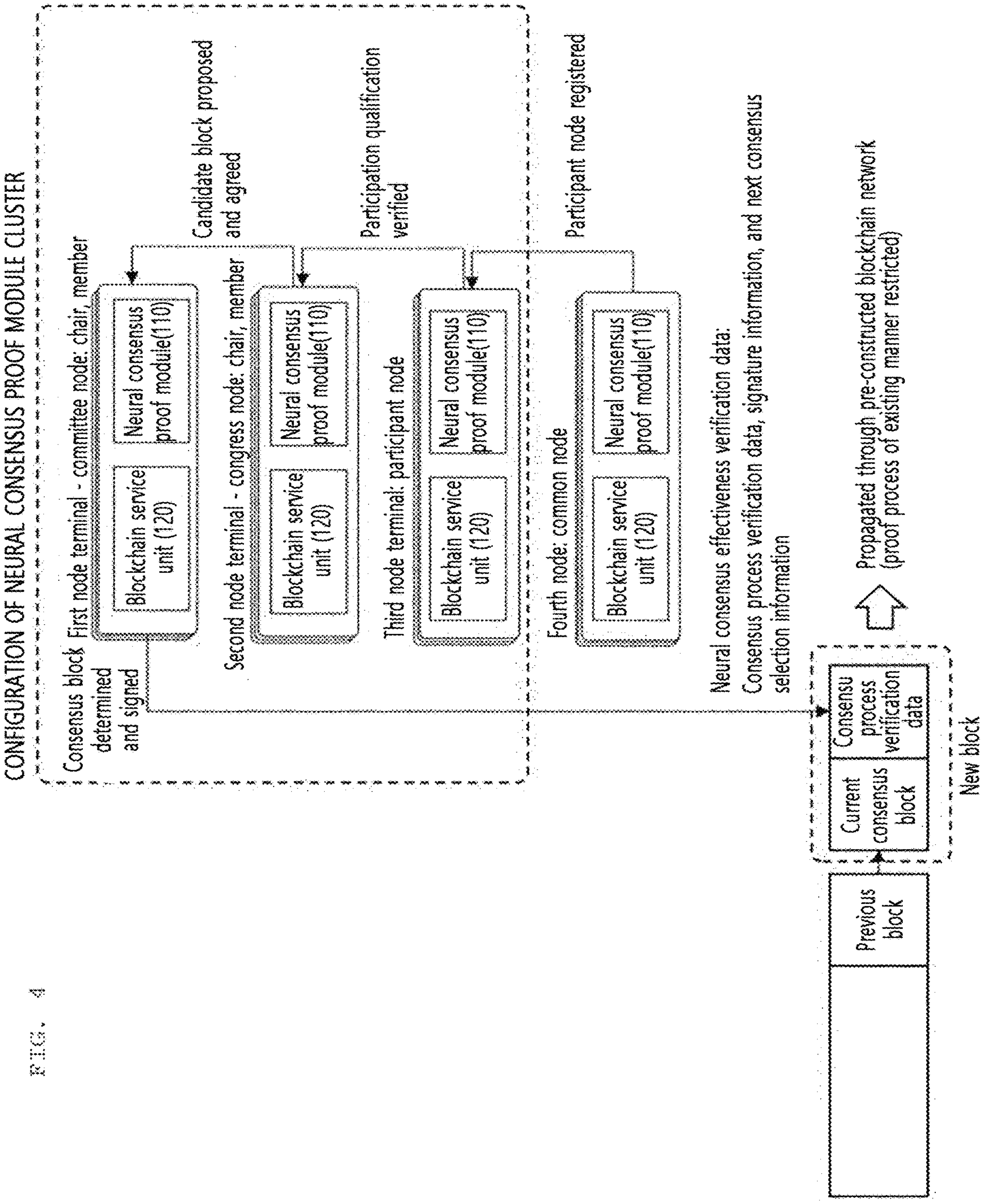
FIG. 4 is a conceptual diagram for explaining the configuration of a neural consensus proof module cluster according to an embodiment of the present disclosure and the entire process.

In more detail, referring to FIGS. 3 and 4, FIG. 3 is a block diagram showing in more detail a node device according to an embodiment of the present disclosure and FIG. 4 is a conceptual diagram for explaining the configuration of a neural consensus proof module cluster according to an embodiment of the present disclosure and the entire process.

The node terminals 100 of the blockchain system 1000 according to the present disclosure may be included in a neural consensus proof module cluster for configuring a next block through a random node selection process and each may include a neural consensus proof module 110 included in the neural consensus proof module cluster to perform a random consensus proof process according to an embodiment of the present disclosure.

Further, the node terminals 100 are connected to the non-random consensus blockchain network 200 and each may include a blockchain service unit 120 performing a sharing-propagating process of a next block configured by the random consensus proof process through the non-random consensus blockchain network 200.

Accordingly, in an embodiment of the present disclosure, the node terminals 100 may be node terminals 100 that participate in the non-random consensus blockchain network 200, and are selected by the random consensus selection process and selectively granted with a right to be able to create respective blocks in accordance with consensus conference, and accordingly, the random consensus blockchain network system 1000 can be independently constructed.

Further, as shown in FIG. 4, the node terminals 100 can selectively perform the functions of a fourth node terminal that is a common node, a third node terminal that is a participant node, a second node terminal that is a congress node, and a first node that is a committee node.

The neural consensus proof module cluster may be constructed with the third node terminal registered as a participant node for a basis. The participant node that is the third node terminal can verify a participation qualification on the basis of next consensus selection information that is obtained from consensus effectiveness verification data of a new propagated block and the second node terminal may be a terminal that processes a congress node function operation by ascertaining whether a congress node is selected in accordance with the verification result. The first node terminal may be a terminal that processes a committee node function operation by ascertaining whether a committee node is selected in accordance with the verification result.

A node terminal 100 selected as a congress node can perform a candidate block proposal and consensus process like the second node terminal shown in FIG. 4, and a node terminal 100 selected as a committee node can perform a process of configuring and distributing consensus effectiveness verification data of a next block by determining a consensus block and collecting signature information. In this case, the consensus effectiveness verification data may include conference process verification data, multiple signature information, and next consensus selection information, and can be propagated through a pre-constructed non-random consensus blockchain network 200.

As a new block is configured and propagated in this way, the proof process of the existing non-random consensus blockchain network 200 can be processed to be restricted and Pow or Pos proof-based next block creation between node terminals 100 can be processed only in an exceptional case in which the number of some nodes lacks a number set on the basis of a PBFT standard.

Meanwhile, such a participation qualification and verification information of the nodes 100 can be calculated on the basis of a random value, which is calculated for each node in accordance with participant node registration, and can be mutually opened and verified, in which a nonce chain can be used, as described above. For example, the node terminals 100 can be determined as at least one of a participant node, a congress node, a committee node, or a chair node, depending on what value a self qualification verification value accompanying hash processing, which uses a nonce value included in next consensus selection information, a height value of a current block, etc., is.

Further, as shown in FIG. 3, a node terminal 100 according to an embodiment of the present disclosure includes a device information setting unit 111, a node information setting unit 112, an effectiveness verification processing unit 113, a qualification verification processing unit 114, a consensus node functioning unit 115, and a data interface unit 116.

The device information setting unit 111 obtains, stores, and manages device information of a terminal 100 in which the neural consensus proof module 110 is installed. In this case, the device information may include at least one of node name information, device address information, device performance information, device reliability information, a used network information of the terminal 100. The device information can be used to recognize or construct a neural consensus proof module cluster, perform a vote consensus process, etc.

The node information setting unit 112 sets node information for registering a non-random consensus blockchain network 200 and a participant node. The set node information may include blockchain network client address information and the terminal 100 can connect to the blockchain network using the blockchain network client address information and can obtain or share block information.

The effectiveness verification processing unit 113 obtains new block data propagated through the non-random consensus blockchain network 200, extracts effectiveness verification data from the new block data, and obtains neural consensus designation information of a next block created on the basis a random consensus proof process in accordance with verification processing of the effectiveness verification data.

Further, the consensus node functioning unit 115 is selectively driven on the basis of the neural consensus designation information of a next block and creates effectiveness verification data of the next block, and can selectively drive at least one of a chair node functioning unit 1151, a congress node functioning unit 1152, and a committee node functioning unit 1153. The chair node functioning unit 1151 may be selectively operated through at least partial comparison of neural consensus designation information and the nonce value of a designated node terminal 100, but the present disclosure is not limited to this selection manner.

First, the chair node functioning unit 1151 can perform a chair process corresponding to congress and committee nodes and can collect, from congress nodes, delegation information and participation qualification verification information of an effective transaction block taken from a transaction pool of a blockchain network, and next block consensus candidate information. Accordingly, 3f+1 (f is a natural number) or more congress nodes for the next block can be selected and 2f+1 or more committee nodes can be selected.

Further, the congress node functioning unit 1152 can transmit delegation information and participation qualification verification information of an effective transaction block taken from a transaction pool of the non-random consensus blockchain network 200 to the node terminal 100 in which the chair node functioning unit 1151 is driven.

Further, the chair node functioning unit 1151 can select a block coinciding over a consensus quorum of a congress node as a candidate block from transaction blocks proposed by the congress node, can transmit a message requesting partial signature processing for multiple signature regions expressing consensus for the candidate block to node terminals 100 in which the committee node functioning unit 1153 was driven. For example, the chair node functioning unit 1151 can determine f+1 coinciding transaction data candidate blocks from 2f+1 transaction data candidate blocks and can transmit a message requesting partial signature processing for multiple signature regions to the committee functioning node 1153, and a node 100 in which the committee node functioning unit 1153 was driven can process and transmit partial signatures expressing consensus corresponding to the candidate blocks to the node terminal 100 in which the chair node functioning unit 1151 was driven Accordingly, the chair node functioning unit 1151 verifies and determines a candidate block for which multiple signature processing has been finished in accordance with committee consensus as distribution block, and creates a new block by creating and combining effectiveness verification data corresponding to the consensus process with the distribution block.

The data interface unit 116 can convert the crated new block into the format of the non-random consensus blockchain network 200 and then transmit the new block to the blockchain service unit 120.

Then, the blockchain service unit 120 can propagate the new block through the non-random consensus blockchain network 200, and the new block not only can be propagated through the non-random consensus blockchain network 200, but can be added to a transaction data memory pool (mem pool) by operation of a transaction data management unit 121.

Meanwhile, though not shown, the node terminal device 100 may include a memory that the blockchain service unit 120 and the neural consensus proof module 110 can use. The memory may include computer-readable instructions, and as the instructions stored in the memory are executed in a processor, the blockchain service unit 120 and the neural consensus proof module 110 can perform the operations described above. The memory may be a volatile memory or a nonvolatile memory.

The memory may include a storage to store data of a user. The storage may be an embedded multimedia card (eMMC), a solid state drive (SSD), a universal flash storage (UFS), etc. The storage may include at least one or more nonvolatile memory device. The nonvolatile memory device may be a NAND Flash Memory, a Vertical NAND (VNAND), a NOR Flash Memory, a Resistive Random Access Memory (RRAM), a Phase-Change Memory (PRM), a Magnetoresistive Random Access Memory (MRAM), a Ferroelectric Random Access Memory (FRAM), a Spin Transfer Torque Random Access Memory (STT-RAM), etc.

Figure 5:
FIG. 5 is a flowchart for explaining a method of operating the node device according to an embodiment of the present disclosure.

FIG. 5 is a flowchart for explaining a method of operating a node terminal 100 according to an embodiment of the present disclosure.

Referring to FIG. 5, when a node terminal 100 according to an embodiment of the present disclosure obtains new block data propagated through a pre-constructed non-random consensus blockchain network 200 (S101), the effectiveness verification processing unit 113 extracts effectiveness verification data from the new block data and obtains consensus designation information according to verification processing of the effectiveness verification data (S103).

The effectiveness verification processing unit 113 can obtain neural consensus designation information of a next block created on the basis of a random consensus proof process, in accordance with verification processing of the effectiveness verification data, and as described above, the effectiveness verification data may include consensus process verification data corresponding to the random consensus proof process.

For example, the consensus process verification data may include nonce chain-based qualification proof hash data and multiple signature data formed by combining partial signatures of the congress node as member qualification verification information of a congress node that processes consensus for transaction data. Further, the neural consensus designation information of a next block may include nonce information for verifying the participation qualification of a neural consensus corresponding to the next block.

Then, the node terminal 100 determines whether it has been selected as a node configuring a neural consensus proof cluster node for the next block (S107), and ascertains whether it is a chair node on the basis of consensus designation information when it has been selected (S109).

When the node terminal has not been selected as a chair node, it can transmit delegation information and participation qualification information of the effective transaction block taken from the transaction pool of the blockchain network in accordance with the qualification to a congress chair node (S113).

Accordingly, a node terminal 100 in which the chair node functioning unit 1151 was driven can collect delegation information and next block consensus candidate information from other nodes (S115).

Further, the node terminal 100 in which the chair node functioning unit 1151 was driven determines an agreed candidate block from node terminals 100 in which the congress node functioning units 1152 were driven, and transmits a message requesting partial signature processing for multiple signature regions expressing consensus for the candidate block to a committee member node (S117).

Further, the node terminal 100 in which the chair node functioning unit 1151 was driven verifies and determines a candidate block, for which multiple signature processing has been finished in accordance with the committee consensus, as a distribution block (S119), creates a new block by creating and combining effectiveness verification data with the distribution block (S121), registers the combined new block into the transaction pool of the non-random consensus blockchain network 200, and propagates the new block through the pre-constructed non-random consensus blockchain network 200 (S123).

FIGS. 6 to 9 are views exemplifying data of each step that are processed by a consensus proof module node device according to an embodiment of the present disclosure.

Figure 6:
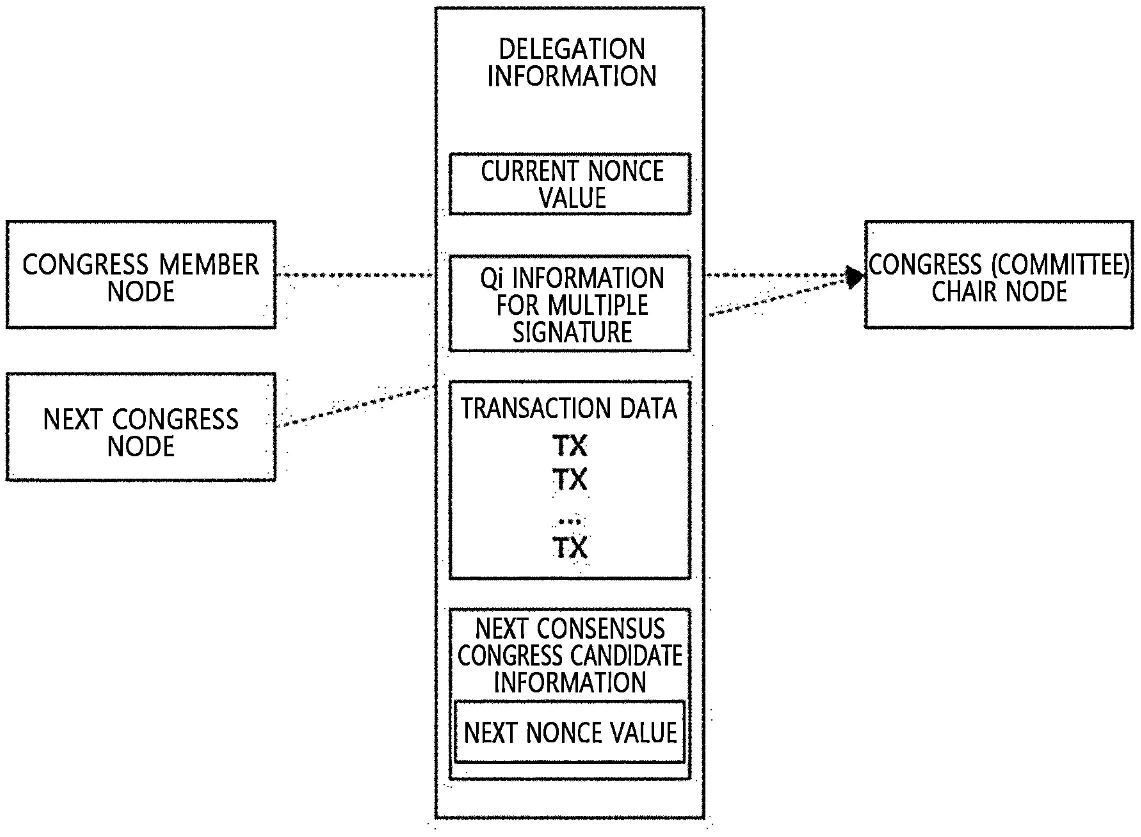
FIGS. 6 to 9 are views exemplifying data by step that are processed by a consensus proof module node device according to an embodiment of the present disclosure.

FIG. 6 exemplifies delegation information that is transmitted to a chair node in a delegation request step for configuring a current block, in which a nonce value corresponding to a current block height, Qi value information that each congress node intends to use for multiple signatures, transaction data, next consensus congress candidate information, and a nonce value of the next block height may be included in the delegation information.

Figure 7:
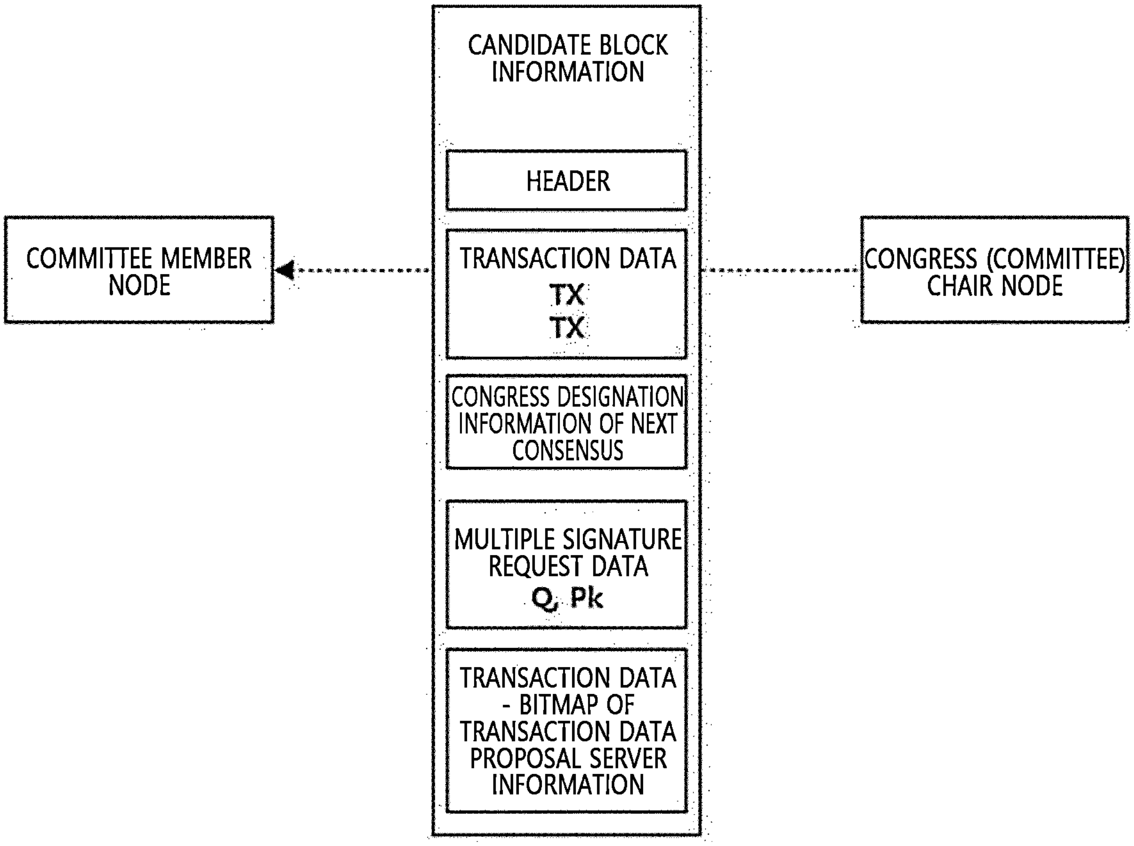

Further, FIG. 7 exemplifies candidate block information that is transmitted to a committee node from a chair node in a preparation step, in which the candidate block information may include header information including a Merkle root, candidate block transaction data, congress designation information of a next consensus, multiple signature request data (Q data integrating Qi, open key Pk), and verification data. Bitmap information that makes it possible to recognize server information proposing transaction data, etc. may be exemplified as the verification data, which makes it possible to prevent a case, etc. proposed by a chair node itself.

Figure 8:
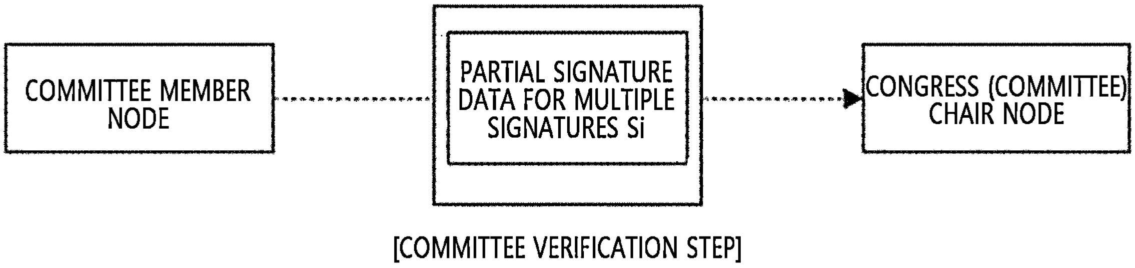

Further, FIG. 8 exemplifies partial signature data that are propagated to a chair node from a committee node in a process in which committee verification is processed, in which the chair node can calculate signature completion data S by integrating partial signature data Si.

Figure 9:
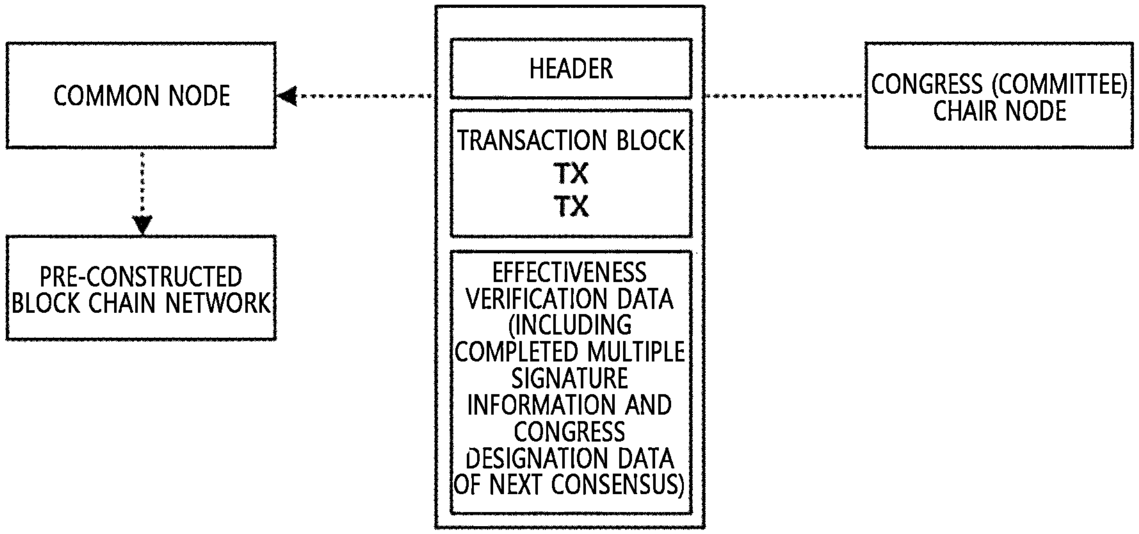

Meanwhile, FIG. 9 shows the configuration of a new block that is created and propagated in accordance with an embodiment of the present disclosure, in which the new block may include header information, transaction block information, and effectiveness verification data. The effectiveness verification data, as described above, may include next consensus designation information, completed multiple signature information, and various items of information that can verify a consensus process and a participation qualification. Further, a Merkle root value for effectiveness verification of block data themselves, etc. may be included also in the header information.

Accordingly, the effectiveness verification processing unit 113 primarily verifies a consensus process by first ascertaining multiple signature information, can perform secondary verification by ascertaining whether the Merkle root value of a header is normal, and performs third verification by comparing the Merkle root value with a Merkle root value calculated again using transaction block information, thereby enabling safe processing of a transaction block.

Figure 10:
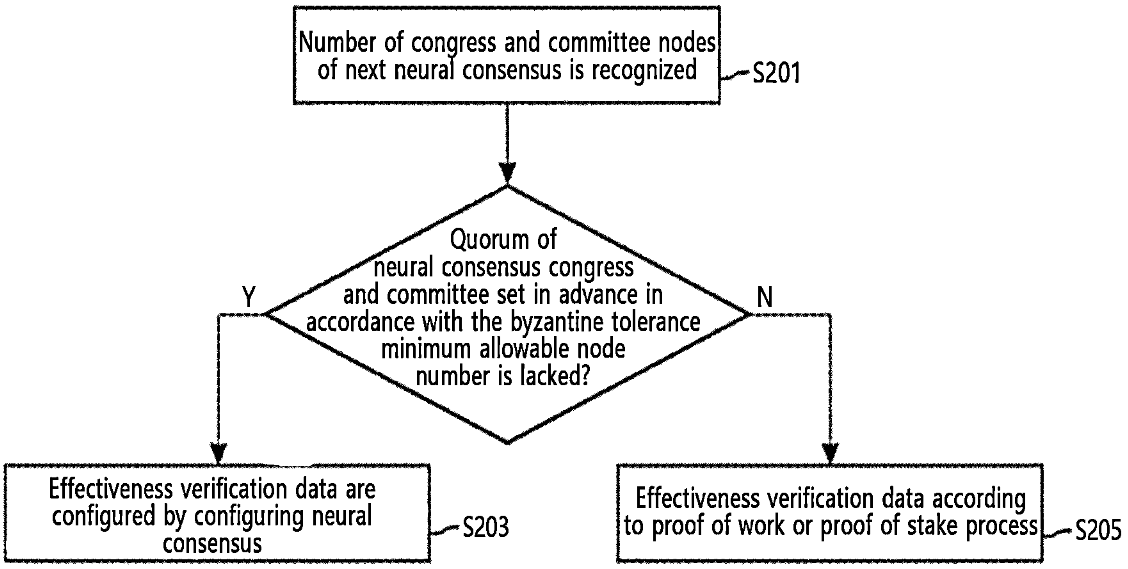
FIG. 10 is a flowchart for explaining a method of operating a node device according to another embodiment of the present disclosure.

FIG. 10 is a flowchart for explaining a method of operating a node terminal device according to another embodiment of the present disclosure.

Referring to FIG. 10, a node terminal 100 according to another embodiment of the present disclosure first recognizes the number of congress and committee nodes of a next neural consensus (S201).

Further, the node terminal 100 determines whether a preset consensus quorum is not reached on the basis of Byzantine tolerance minimum allowable node number.

For example, a consensus quorum can be determined by a maximum Byzantine number (maximum allowable number of malicious nodes) that can be selected by a node selection probability P in correspondence to the number N of participant nodes, and when congress nodes are at least 3f+1 (f is a natural number) and committee nodes are at least 2f+1 or more, the nodes can satisfy the consensus quorum.

When the number of consensus nodes lacks the quorum of neural consensus congress and committee set in advance in accordance with the Byzantine tolerance minimum allowable node number, the node terminal 100 performs selective exceptional processing of forming the effectiveness verification data of a next block in the Proof of Work (PoW) or Proof of stake (Pos) manner (S205).

On the contrary, when the number of consensus nodes is equal to or more than the quorum of neural consensus congress and committee set in advance in accordance with the Byzantine tolerance minimum allowable node number, the Proof of Work (PoW) or Proof of stake (Pos) process of the non-random consensus proof-based blockchain network is restricted, a neural consensus is configured using the process of FIG. 5 described above, and effectiveness verification data are configured, thereby being able to create and propagate a new block (S203).

Figure 11:
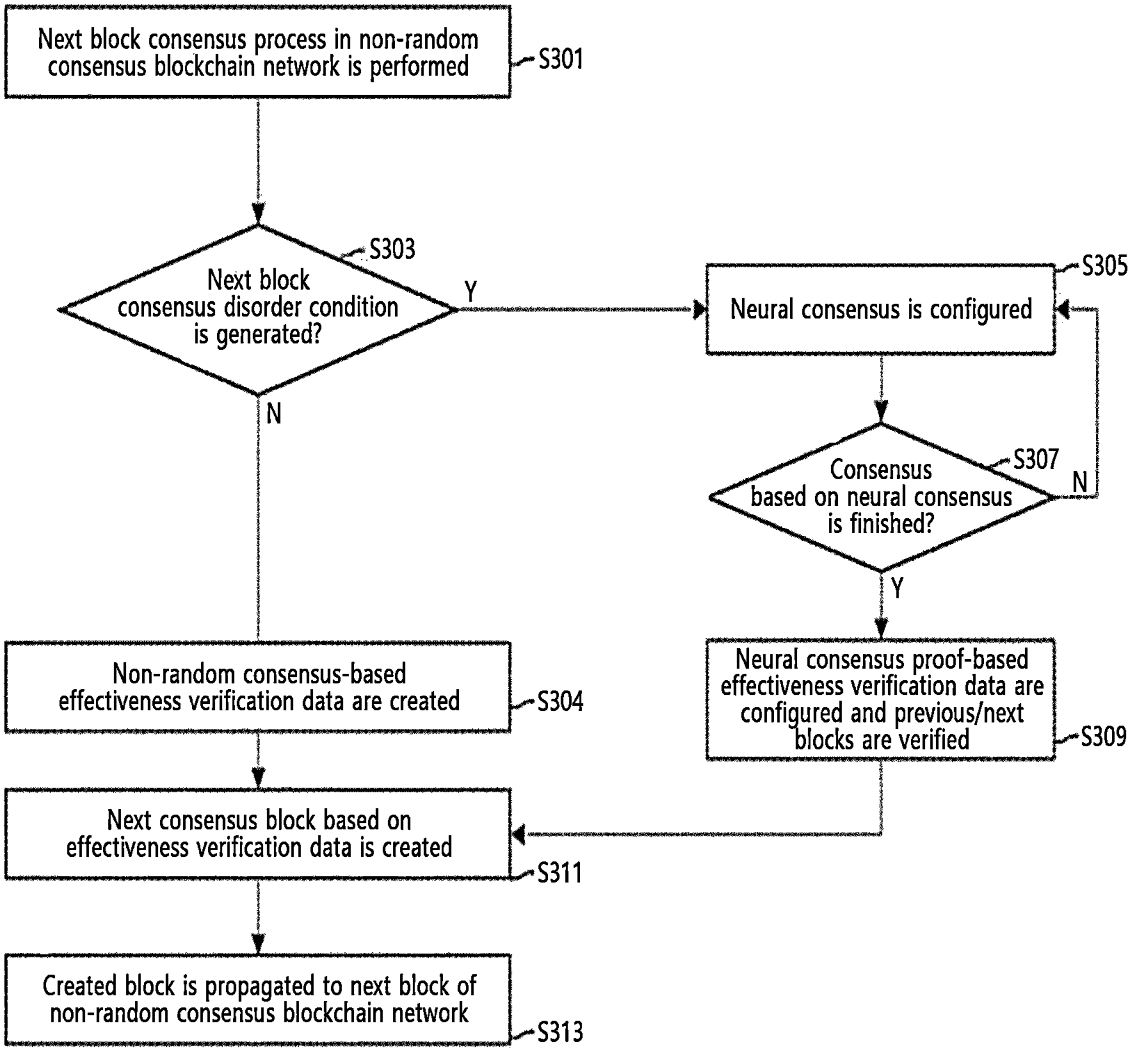
FIG. 11 is a flowchart for explaining a method of operating a node terminal device according to another embodiment of the present disclosure.

FIG. 11 is a flowchart for explaining a method of operating a node terminal device according to another embodiment of the present disclosure.

Referring to FIG. 11, performing processes of recognition or construction of a neural consensus proof module cluster and a vote consensus process according to another embodiment of the present disclosure can be used to quickly create a next block to secure continuity when a disorder is generated in a non-random consensus blockchain network 200.

In general, in a non-random consensus manner of proof of work or proof of stake such as Ethereum, there are problems such as timeout of a block creation cycle or unstable consensus by repeated transactions due to abnormal service driving or overload. Accordingly, a service is temporarily stopped or hardfork is performed, so a current non-random consensus blockchain network 200 is not guaranteed with sufficient continuity in block creation and is vulnerable to dealing with disorders.

Accordingly, a process, which performs recognition or construction of a neural consensus proof module cluster and a vote consensus process according to an embodiment of the present disclosure, is complementarily performed when a disorder is generated while the existing non-random consensus blockchain network 200 is driven, so the process can be applied in a manner of securing continuity.

This can be achieved by setting one or more of node terminals constituting the existing non-random consensus blockchain network 200 to operate as the node devices 100 constituting the neural consensus proof module cluster described above without constructing a specific infrastructure when a preset disorder condition is generated.

In more detail, referring to FIG. 11, the node terminals 100 according to an embodiment of the present disclosure may be node terminals constituting the non-random consensus blockchain network 200 and may be terminals that operate as node devices 100 constituting a neural consensus proof module cluster and configure and propagate neural consensus-based effectiveness verification data as a next block when a preset next block consensus disorder condition is generated.

For such terminal configuration, the node terminals 100 may be driven as node devices 100 constituting a preset neural consensus proof module cluster and may be driven in a continuity security mode for securing continuity unlike converting and driving the existing block chain described above.

For example, the node terminals 100 can be driven in any one of a network conversion mode in which the node terminals 100 convert and use the existing non-random consensus blockchain network 200 as a random consensus blockchain network and a continuity security mode in which the node terminals 100 are driven in an assistant manner when a disorder is generated in the existing non-random consensus blockchain network 200, and FIG. 11 shows the operation in the continuity security mode.

First, a node terminal 100 performs a next block consensus process in a common non-random consensus blockchain network 200 (S301).

Further, the node terminal 100 determines whether a next block consensus disorder condition is generated (S303).

In this case, various conditions may be set in advance for the next block consensus disorder condition, and preferably, a timeout condition when a block is not created for a first time may be used. For example, the first time may be the same as a second time that is a timeout time prescribed in the process of proof of work or proof of stake of the non-random consensus blockchain network 200.

Further, the first time may be set as a time shorter than the second time in consideration of continuity of work such that configuring a neural consensus proof module cluster is processed earlier than the timeout of the non-random consensus blockchain network 200.

Further, temporal service stop, etc. may be exemplified as the next block consensus disorder condition. For example, when the service of the non-random consensus blockchain network 200 is stopped due to hardfork or temporal service operation problem, assistant block creation processing that accompanies configuring a neural consensus proof module cluster may be set to be continuously performed.

When a disorder condition about the next block consensus is not generated, non-random consensus-based effectiveness verification data on the non-random consensus blockchain network 200 are created in the manner of common proof of work or proof of stake (S304).

Further, when a disorder condition about the next block consensus is generated, the node terminal 100 described above can operates as the node device 100 constituting a neural consensus proof module cluster and performs the random-type neural consensus proof module cluster configuration process described with reference to FIGS. 4 and 5 and a consensus process based on the process (S305).

When consensus based on the neural consensus proof module cluster is finished (S307), the node terminal 100 configures neural consensus proof-based effectiveness verification data and verifies data effectiveness between a previous block and a next block configured in the non-random consensus blockchain network 200 on the basis of the configured effectiveness verification data (S309).

In this case, specific height information, previous block information, and next block information can be used for data effectiveness verification between the previous block and the next block, and a block of non-random consensus format that can be used in the non-random consensus blockchain network 200 can be used through effectiveness verification on the basis of the information.

Thereafter, the node terminal 100 creates a next consensus block based on the non-random consensus-based effectiveness verification data in step S304 or the neural consensus proof-based effectiveness verification data verified in step S309 (S311).

For example, the node terminal 100 creates a next block including the neural consensus proof-based effectiveness verification data, that is, can create a next block of non-random consensus format verified by step S309. In more detail, when a current maximum height is 100, the node terminal 100 can create a next block that makes consensus be restarted on the non-random consensus blockchain network 200 from a block having a height of 110.

Further, the node terminal 100 propagates the created block as the next block of the non-random consensus blockchain network 200 (S313).

As such process of the node terminal 100 is performed, a neural consensus proof-based block creation process, which is driven in an assistant manner when a disorder is generated in the non-random consensus blockchain network 200 of proof of work or proof of stake manner such a Ethereum or Bitcoin, is performed, so continuity of a service can be sufficiently secured.

Figure 12:
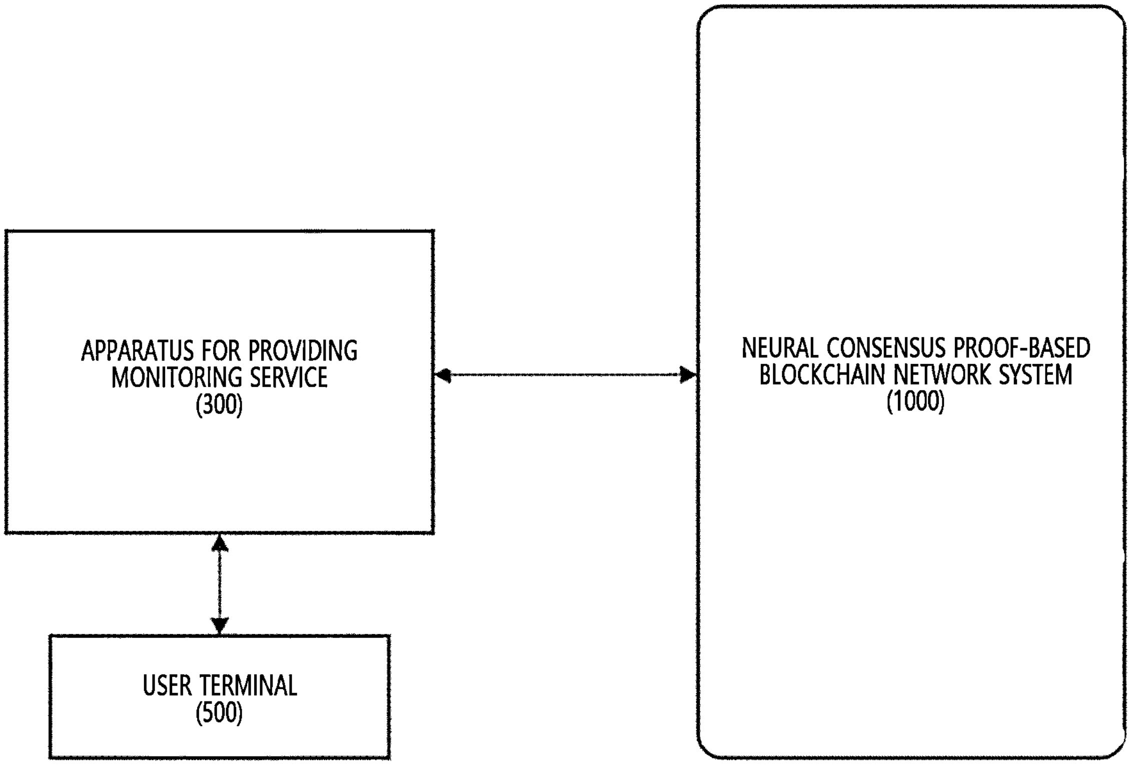
FIG. 12 is a diagram for explaining a monitoring service system according to an embodiment of the present disclosure.
Figure 13:
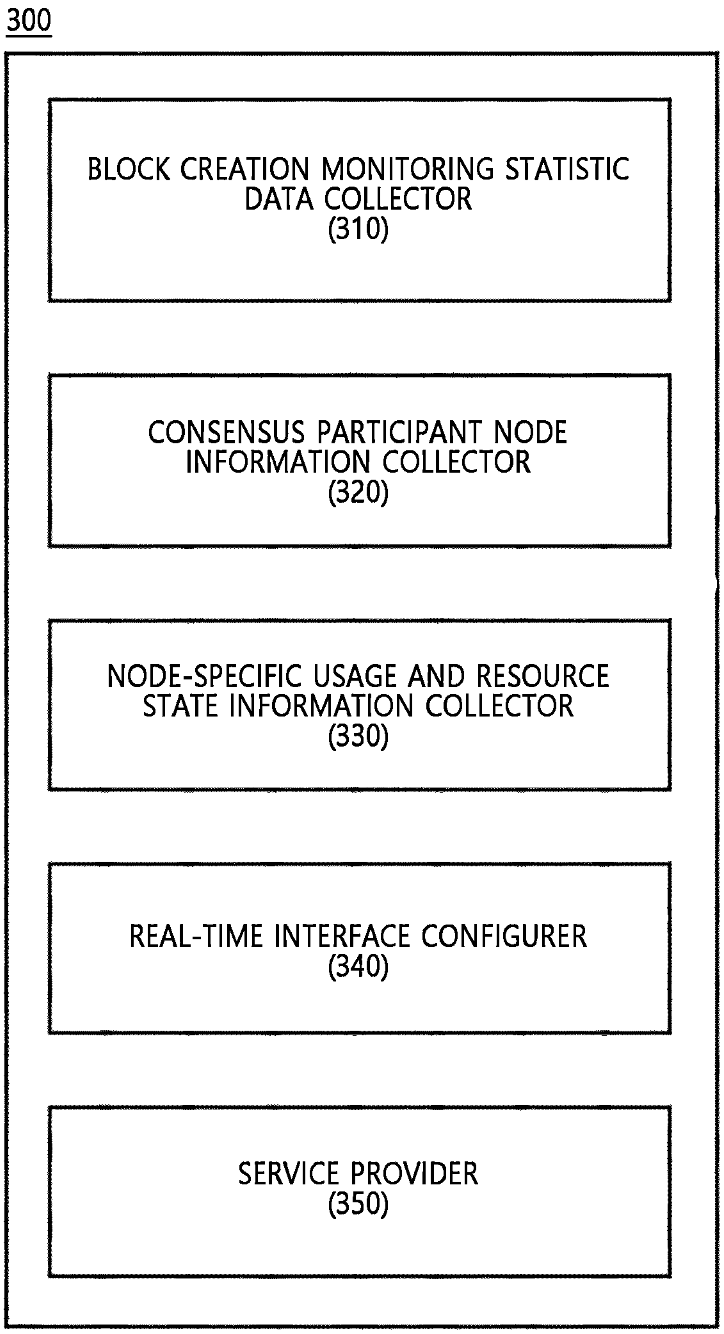
FIG. 13 is a block diagram for explaining in more detail an apparatus for providing a service according to an embodiment of the present disclosure.

FIG. 12 is a diagram for explaining an apparatus for providing a monitoring service according to an embodiment of the present disclosure and FIG. 13 is a block diagram for explaining in more detail an apparatus for providing a service according to an embodiment of the present disclosure.

Referring to FIG. 12 first, an apparatus 300 for providing a monitoring service according to an embodiment of the present disclosure may be a computer device connected to the neural consensus proof-based blockchain network system 1000 according to the present disclosure and a user terminal 500 through a network.

In this configuration, the apparatus 300 for providing a monitoring service, which is an apparatus that monitors, in real time, blockchain network information of the neural consensus proof-based blockchain network system 1000 and configures and provides a real-time monitoring interface based on the monitored information to the user terminal 500, may be one node terminal constituting the neural consensus proof-based blockchain network system 1000 or a separate terminal device connected to the neural consensus proof-based blockchain network system 1000.

In this configuration, the apparatus 300 for providing a monitoring service may include a communication module for connecting to the user terminal 500 and a blockchain network. The blockchain network, for example, may be implemented as a wired network such as a Local Area Network (LAN), a Wide Area Network (WAN), or a Value Added Network (VAN). Further, the blockchain network may be implemented as all kinds of wireless networks such as a mobile radio communication network, a satellite communication network, Bluetooth, Wireless Broadband Internet (Wibro), High Speed Downlink Packet Access (HSDPA), Wi-Fi, Long Term Evolution (LTE). Depending on necessity, the blockchain network may be a wired-wireless mixed network.

Accordingly, the apparatus 300 for providing a monitoring service can monitor a neural consensus proof-based block creation process that is performed in the neural consensus proof-based blockchain network system 1000, and can process the monitored information into a real-time monitoring interface and provide the real-time monitoring interface to the user terminal 500.

In this configuration, the user terminal 500 may include various common computer devices including a data communication model, a user input module, and the output module of a graphic interface for receiving and outputting the real-time monitoring interface, and various devices such as a computer, a laptop, a tablet, and a smartphone may be exemplified.

Further, the real-time monitoring interface includes at least one of a process of creating and propagating each block data, node information creating each block data, transaction information included in each block data, consensus process verification data corresponding to a random consensus proof process of each block data, nonce information for verifying the participation qualification of a neural consensus corresponding to a next block of each block data, congress node member information corresponding to each node information, committee member information corresponding to each node information, node-specific usage and resource state information, and a real-time block creation graphic interface, thereby enabling a user to easily visually check the state of a blockchain network system accompanying the neural consensus proof-based block creation process according to an embodiment of the present disclosure and to efficiently operate the system.

In more detail, referring to FIG. 13, the apparatus 300 for providing a monitoring service according to an embodiment of the present disclosure includes a block creation monitoring statistic data collector 310, a consensus participant node information collector 320, a node-specific usage and resource state information collector 330, a real-time interface configurer 340, and a service provider 350.

First, the block creation monitoring statistics data collector 310 connects to the neural consensus proof-based blockchain network system 1000 and collects block creation monitoring statistics data according to each block creation process. In this case, the block creation monitoring statistics data may include at least one of detailed inquiry information of a newly created block, address-specific public key-based created transaction number and holding tokens inquiry information, transaction statistics information, daily block creation information, information about the accumulated number of created blocks, and the number of transactions per block.

Further, the consensus participant node information collector 320 collects information about consensus participant nodes participating in the neural consensus proof-based block creation process of the neural consensus proof-based blockchain network system 1000.

In this case, the information about consensus participant nodes may include at least one of a committee member node list, a congress member node list, a chair member node list, and a participant node pool list, and may include token information and ip information that correspond to each node.

The node-specific usage and resource state information collector 330 can collect information about the usage and state of resources of each node terminal. In more detail, the node-specific usage and resource state information collector 330 can recognize the usage of a CPU of an individual node, the usage of a memory, the usage of a disk, the usage of resources, and whether it is a normal operation state, and can transmit the recognized node-specific usage and resource state information to the real-time interface configurer 340.

Further, the real-time interface configurer 340 configures a real-time monitoring interface corresponding to the neural consensus proof-based blockchain network system 1000 on the basis of the above-mentioned each block creation monitoring statistics data, consensus participant node information, and node-specific usage and resource state information. In this case, the real-time monitoring interface may be configured as a dashboard-type graphic interface that can monitor each menu in accordance with login to a user account, and may be provided to the user terminal 500 and output on a display screen.

Further, the real-time monitoring interface is configured as an api that provides a dashboard-type graphic interface in accordance with a request from the user terminal 500, so the real-time monitoring interface may be included in response data to a request from a web application, etc. of the user terminal 500 and then provided to the user terminal 500.

In this configuration, the real-time interface configurer 340 can configure an information interface fundamentally showing at least one of the operation state of each of nodes constituting the neural consensus proof-based blockchain network system 1000, the number of nodes, the final number of created blocks, the number of standby transactions, and the number of transactions per hour (tps) through the dashboard-type interface.

Accordingly, the service provider 350 provides the real-time information configured in the real-time interface configurer 340 to the user terminal 500. In this configuration, the user terminal 500 may be a terminal in which user information such as manager authentication is registered in advance, and when user or manager authentication is confirmed, the service provider 350 can obtain and provide real-time interface information corresponding to the neural consensus proof-based blockchain network system 1000 to the user terminal 500.

Figure 14:
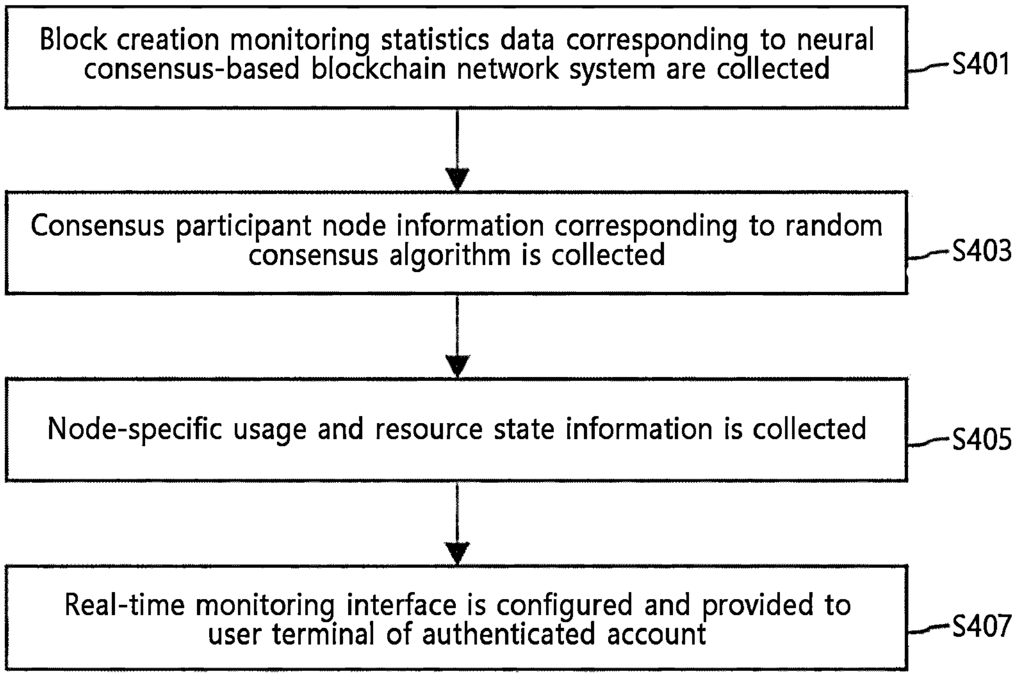
FIG. 14 is a flowchart for explaining the operation of the apparatus for providing a service according to an embodiment of the present disclosure.

FIG. 14 is a flowchart for explaining the operation of the apparatus for providing a service according to an embodiment of the present disclosure.

Referring to FIG. 14, the apparatus 300 for providing a monitoring service according to an embodiment of the present disclosure first collects block creation monitoring statistics data corresponding to the neural consensus-based blockchain network system according to an embodiment of the present disclosure (S401).

Further, the apparatus 300 for providing a monitoring service collects consensus participant node information corresponding to the random consensus algorithm of the neural consensus proof-based blockchain network system 1000 (S403).

Then, the apparatus 300 for providing a monitoring service collects node-specific usage and resource state information (S405).

Further, the apparatus 300 for providing a monitoring service configures a real-time monitoring interface through the real-time interface configurer 340 and provides the real-time monitoring interface to the user terminal 500 of an authenticated account (S407).

FIGS. 15 to 19 are exemplary diagrams of a real-time monitoring interface that is provided to a user terminal in accordance with an embodiment of the present disclosure.

Figure 15:
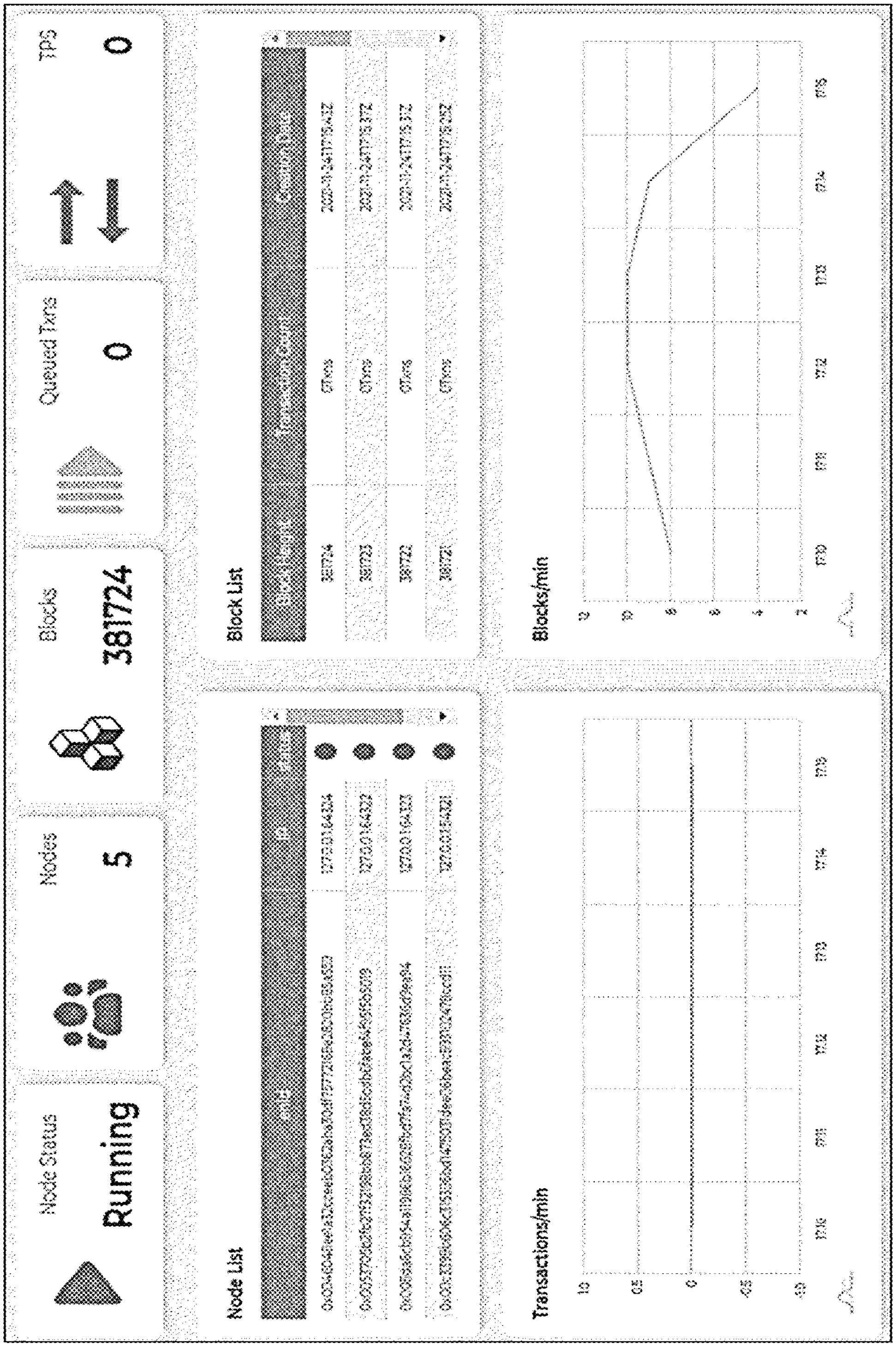
FIGS. 15 to 19 are exemplary diagrams of a real-time monitoring interface that is provided to a user terminal in accordance with an embodiment of the present disclosure.

Referring to FIG. 15, FIG. 15 shows a dashboard interface of a real-time interface according to an embodiment of the present disclosure, in which a user terminal 500 can be provided with at least one of node operation state information, node number information, created block number information, standby transaction information, and transaction number-per-hour information from the apparatus 300 for providing a monitoring service through a top interface of the dashboard, and can output the information to a graphic interface.

Further, as shown in FIG. 15, the real-time interface may include a node list, a node-specific token information, IP information, and operation information, and may include a block list interface including, block height information, transaction count information, and creation date information as block-specific block data. Further, transaction-per-hour information and transaction creation-per-hour information are configured as real-time statistics information and can be output from the user terminal 500.

Figure 16:
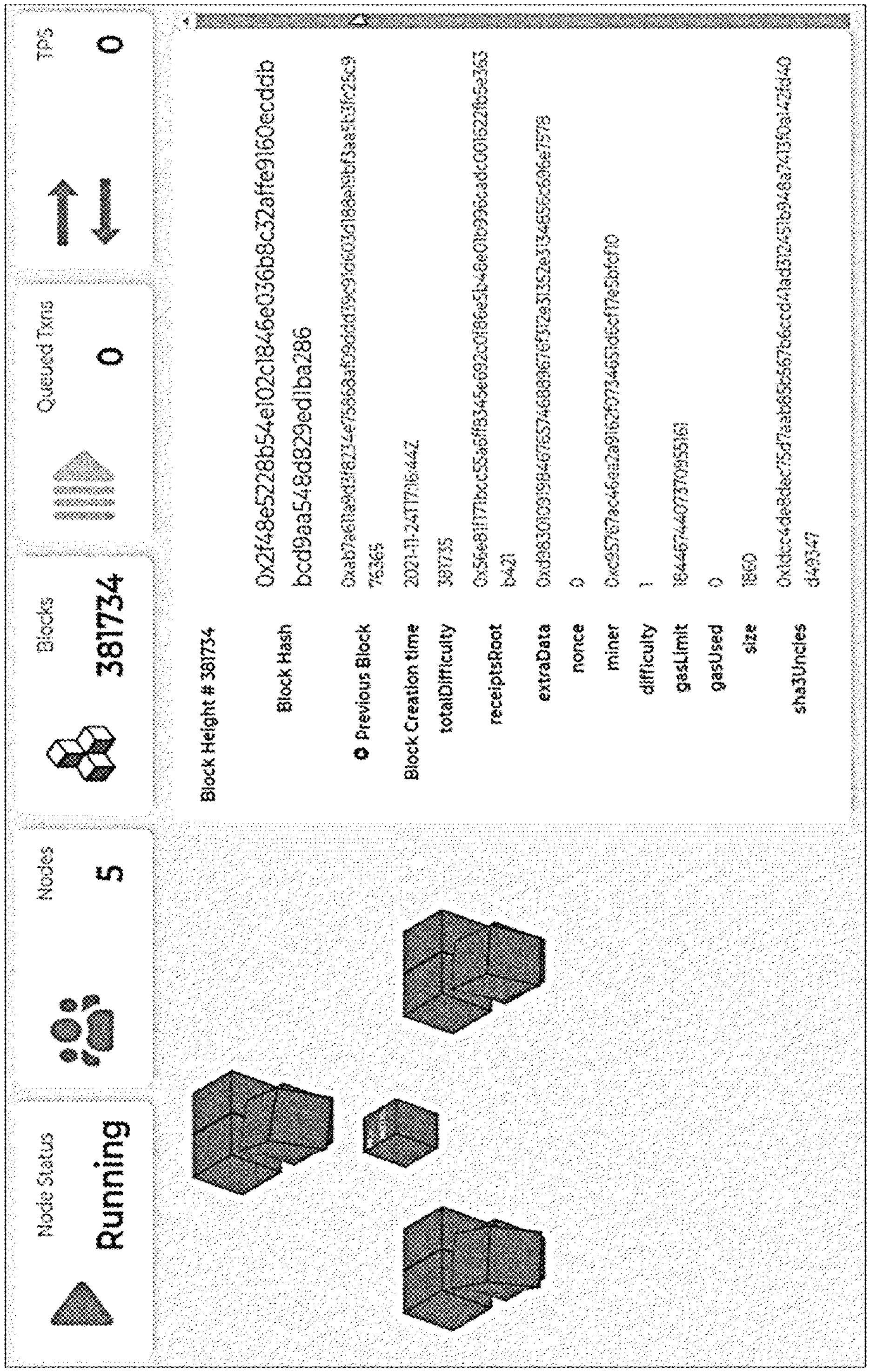

Further, referring to FIG. 16, as shown in FIG. 16, an animation graphic interface in which blocks are crated in real time may also be displayed on the dashboard interface. As shown at the right side in FIG. 16, at least one of block hash information, previous block information, block creation time information, total block creation hash difficulty information, receipt root information, additional data information, nonce information, minor information, individual block creation hash difficulty information, gas limit information, gas use information, size information, and uncle block has information (sha3Uncles) can be displayed as detailed information of block data in correspondence to created block data.

Figure 17:
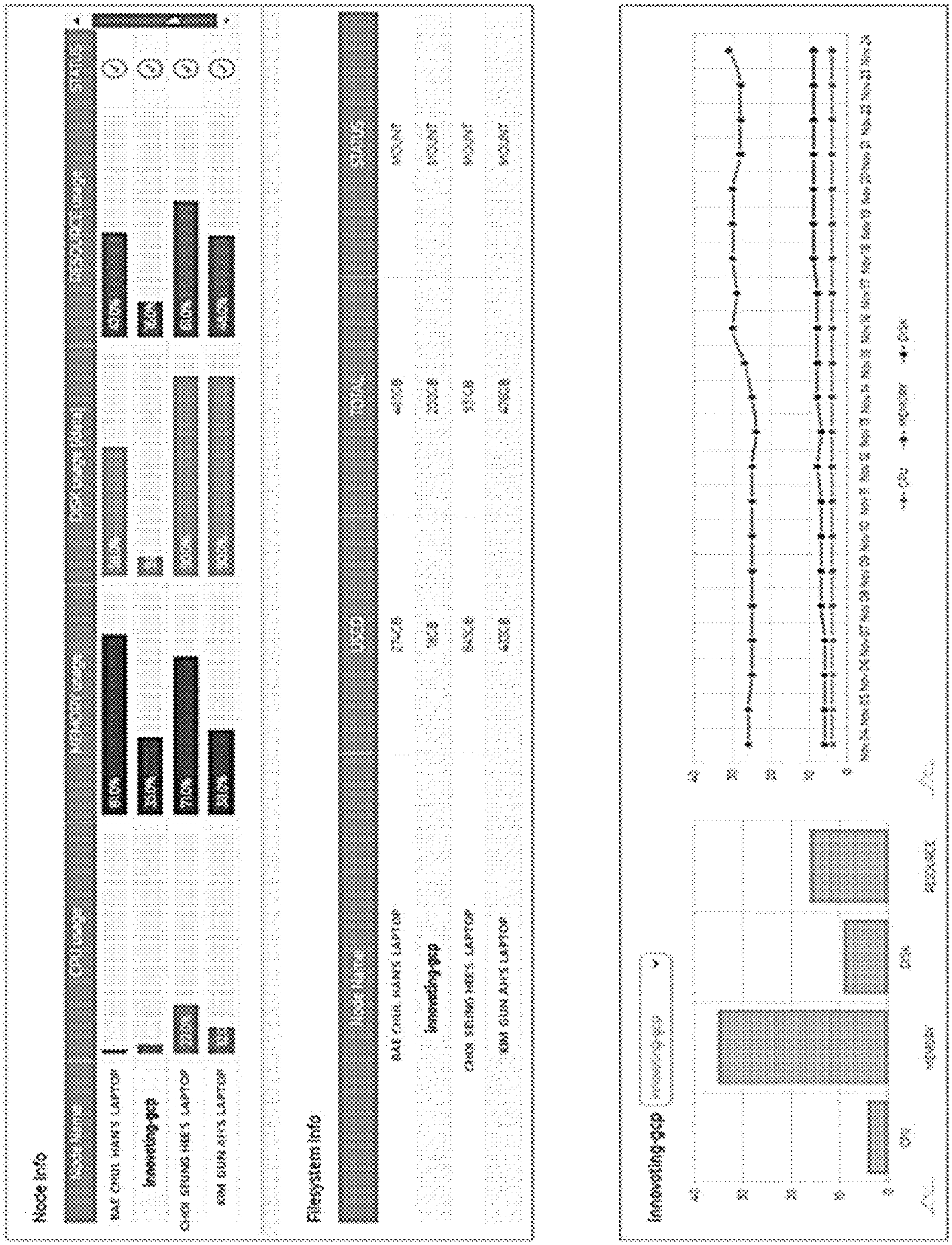

Further, referring to FIG. 17, the real-time monitoring interface according to an embodiment of the present disclosure may include collected information of the node-specific usage and resource state information collector and statistics information thereof. As shown in FIG. 17, the real-time monitoring interface may include the usage of a CPU of an individual node, the usage of a memory, the usage of a disk, the usage of resources, and whether it is a normal operation state. Further, the real-time monitoring interface may further include a graphic interface that shows the node-specific usage and resource state information as daily statistics and converts and displays statistics information into a graph. In this case, when a user selects individual nodes, the real-time monitoring interface can further output each node-specific daily usage.

Figure 18:

FIG. 18 shows a consensus participant node information interface of a real-time monitoring interface according to an embodiment of the present disclosure. As shown in FIG. 18, the apparatus 300 for providing a monitoring service according to an embodiment of the present disclosure can extract node information of real-time block-specific consensus participant nodes, which is created in accordance with a neural consensus proof process of the neural consensus proof-based blockchain network system 1000, and output the node information through a real-time monitoring interface. As shown in FIG. 18, a consensus participant node information interface includes at least one of the list of participant nodes participating in a neural consensus proof process, a committee node list, next chair node information, and a next congress node list and can be output through a display of a user terminal 500 in correspondence to a target block number. In this case, each node can be individually recognized through tokenized information (enId) and ip information.

Figure 19:
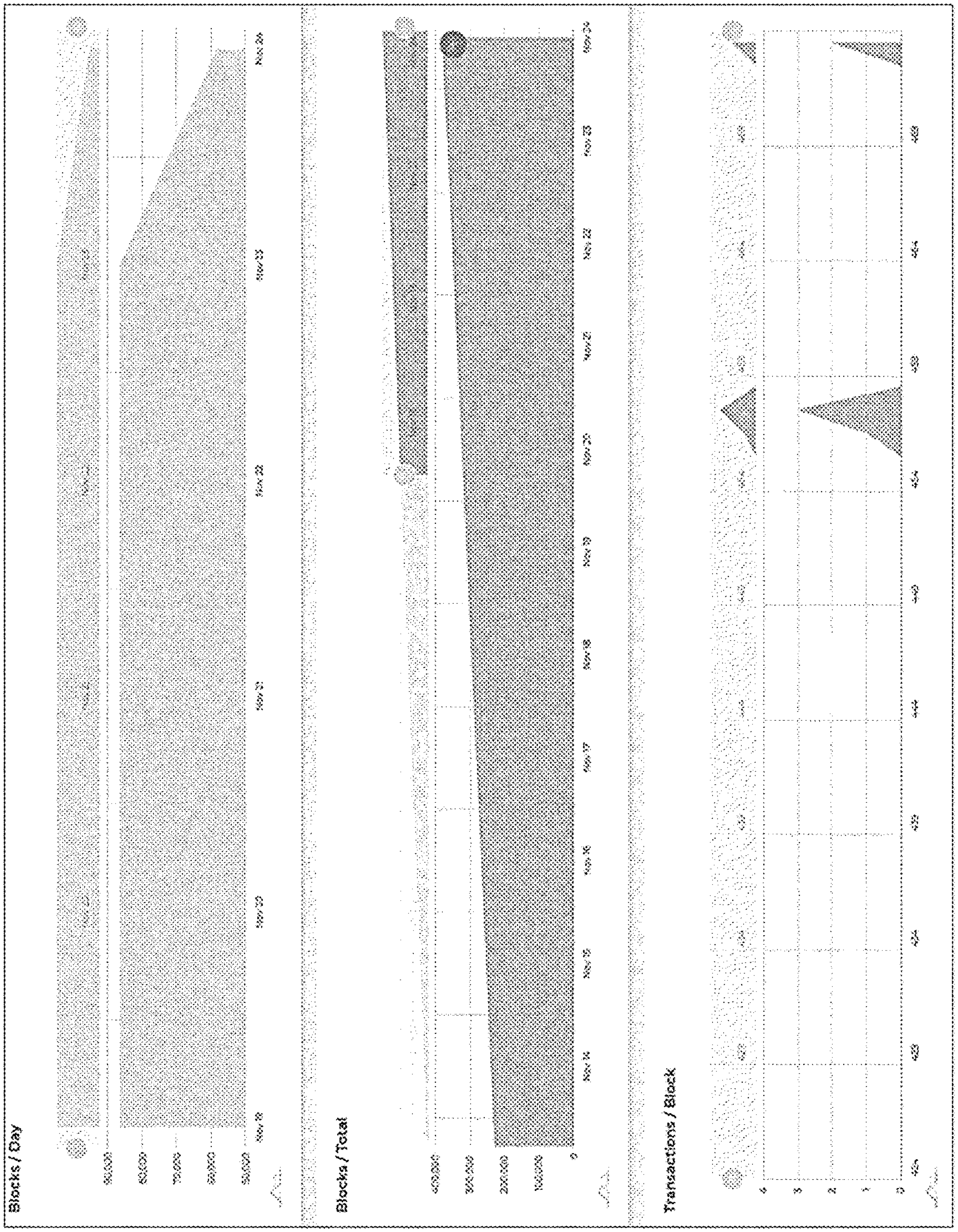

FIG. 19 shows block statistics data of a real-time monitoring interface according to an embodiment of the present disclosure. As shown in FIG. 19, a real-time monitoring interface according to an embodiment of the present disclosure may include a graphic interface configuring daily block creation information, total block creation information, and transaction-per-block information into statistics data. Accordingly, the user of a user terminal 500 can monitor an operation process, an actual block creation process, and a neural consensus proof process of each neural consensus proof-based blockchain network system 1000 according to an embodiment of the present disclosure from each interface, and can efficiently operate the entire blockchain system by monitoring the usage of nodes thereof and the usage of resources.

Figure 20:
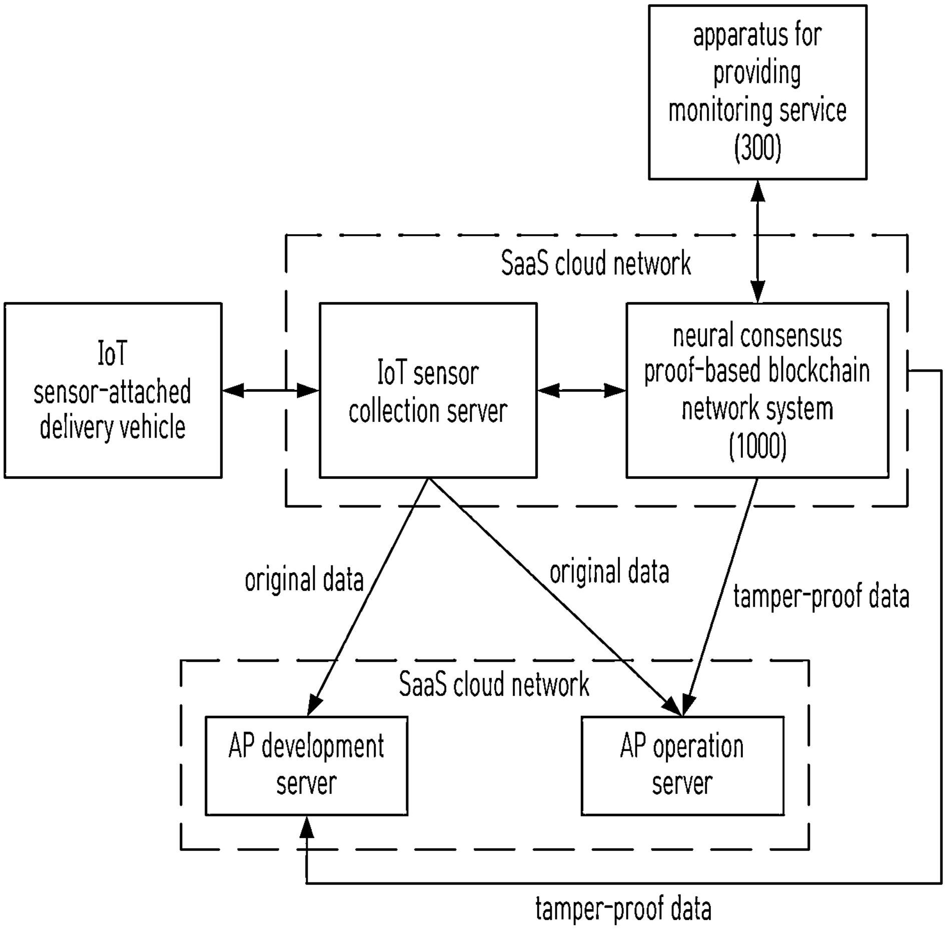
FIG. 20 is a conceptual diagram schematically showing an intelligent safety distribution platform system according to an exemplary embodiment of the present disclosure.

FIG. 20 is a conceptual diagram schematically showing an intelligent safety distribution platform system according to an exemplary embodiment of the present disclosure.

As shown in FIG. 20, a real-time monitoring interface according to an exemplary embodiment of the present disclosure may be used to provide monitoring information of a blockchain system for the intelligent safety distribution platform system. Accordingly, the real-time monitoring interface for managing the intelligent safety distribution platform may be configured and provided to a user terminal 500.

More specifically, referring to FIG. 20, the intelligent safety distribution platform system may be configured as a SaaS (Software as a Service) cloud network, wherein an IoT sensor collection server monitors sensor information of a delivery vehicle with an IoT (Internet of Things) sensor attached, the original data of the collected sensor information is transmitted to an AP (Application) development server and an AP (Application) operation server, and the original data is configured as blockchain data, the tamper-proof data, in a neural consensus proof-based blockchain network system 1000 according to an exemplary embodiment of the present disclosure to be transmitted, shared, stored, and managed through a cloud network.

Accordingly, the apparatus 300 for providing the monitoring service may analyze the environment and characteristics of the logistics business through the provision of the monitoring interface described above and may provide a blockchain system monitoring environment which enables services based on the intelligent safety distribution platform system, thereby constructing a stable infrastructure environment for a cloud-based intelligent safety distribution platform.

Herein, the blockchain data may include logistics distribution and IoT sensor data, which is composed of metadata, product authentication information, and distribution history information, and may be designed as a block model with optimal performance through information service analysis for efficient storage/management within the system. For example, the metadata included in the blockchain data may be defined and designed as collection date and time, latitude, longitude, temperature, humidity, illuminance, and the like.

In addition, the blockchain data may include order information management data based on IoT sensor data, which enables registering business partners and customer information in accordance with a purchase order form and the monitoring and management of the apparatus 300 for providing the monitoring service by mapping the registered order information to a vehicle with an IoT sensor device attached and by processing to be connected and driven with the metadata (GPS, temperature and humidity information) of the order information connected to the mapped vehicle.

In addition, the apparatus 300 for providing the monitoring service may manage a sensor serial number and a registration date and disposal date of sensor type according to the blockchain data management and monitoring of IoT sensor data, provide a service for checking which vehicle or facility it is used in through the registration of the vehicle information management described above, and manage and process to make unusable automatically after the disposal date.

In addition, the apparatus 300 for providing the monitoring service may manage information on vehicles and facilities of delivery and suppliers, thereby providing an interface service that facilitates tracking and management by designating a person in charge or a sensor device according to the input facility information.

Figure 21:
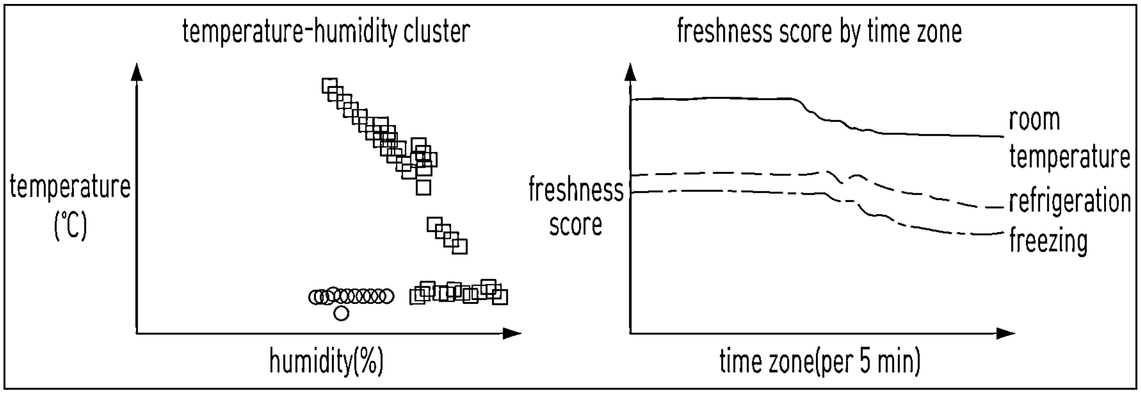
FIG. 21 is a view for illustrating an interface of a safety quality and distribution history management service based on an intelligent safety distribution platform according to an exemplary embodiment of the present disclosure.

FIG. 21 is a view for illustrating an interface of a safety quality and distribution history management service based on an intelligent safety distribution platform according to an exemplary embodiment of the present disclosure.

Referring to FIG. 21, the apparatus 300 for providing the monitoring service according to an exemplary embodiment of the present disclosure may provide an interface for a safety quality and distribution history management service of products distributed through the intelligent safety distribution platform on the basis of the real-time monitoring interface.

More specifically, the apparatus 300 for providing the monitoring service may track block data obtained by performing monitoring the blockchain system and may provide a service for tracking the distribution history of risky products and cold chains, and detecting quality abnormalities for each product.

To this end, the apparatus 300 for providing the monitoring service may measure the freshness in the distribution process by utilizing temperature and humidity data collected through IoT sensor information of blockchain data during the distribution process, through which abnormality detection information is configured, and the configured abnormality detection information is provided to the user terminal 500.

More specifically, as shown in FIG. 21, the apparatus 300 for providing the monitoring service may perform a process of clustering data having similar patterns by applying the temperature and humidity collected from the IoT sensor information of the blockchain data for each risky product group, and determining a specific object not belonging to a cluster as an abnormal value.

In addition, the apparatus 300 for providing the monitoring service may determine that the freshness is lowered as the temperature and humidity data that do not belong to the cluster are obtained, in which case abnormalities in the food ingredients are detected by applying a low score for the freshness. The boundary for determining such clusters may continuously change over time with the data, corresponding to which the apparatus 300 for providing the monitoring service may configure information on a safety quality management service and a risk prediction service based on a blockchain monitoring to provide to the user terminal 500.

Meanwhile, various embodiments described herein, for example, may be implemented in a recording medium that can be read out through a computer using hardware, software, or a combination thereof. According to hardware implementation, embodiments described herein can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for executing functions. In some cases, such embodiments may be implemented by a controller.

Further, the embodiments described above can be achieved by hardware components, software components, and/or a combination of hardware components and software components. For example, the apparatus, methods, and components described in the embodiments can be achieved using one or more common computers or computers for specific purposes such as a processor, a controller, a Central Processing Unit (CPU), a Graphics Processing Unit (GPU), an arithmetic logic unit (ALU), a digital signal processor, a microcomputer, a field programmable gate array (FPGA), a programmable logic unit (PLU), a microprocessor, an Application Specific Integrated Circuits (ASICS), or any devices that can execute instructions and give responses.

Further, the methods according to an embodiment of the present disclosure described above may be made into programs for being executed in a computer. Further, the programs can be stored in computer-readable recording media, and a ROM, a RAM, a CD-ROM, a magnetic tape, a floppy disk, an optical data storage, etc. may be exemplified as the computer-readable recording media.

The computer-readable recording media may be distributed to a computer system that is connected through a network and may store and execute computer-readable codes in a distribution manner. Further, functional programs, codes, and code segments for implementing the method may be easily inferred by programmers in the art.

Although exemplary embodiments of the present disclosure were illustrated and described above, the present disclosure is not limited to the specific exemplary embodiments and may be modified in various ways by those skilled in the art without departing from the scope of the present disclosure described in claims, and the modified examples should not be construed independently from the spirit of the scope of the present disclosure.

What is claimed is:

1. A method of operating an apparatus for providing a service, the method comprising:

collecting block creation monitoring statistics data corresponding to a neural consensus proof-based blockchain network system from a node device which performs a neural consensus proof-based block creation process in accordance with a preset condition while connected to a non-random consensus proof-based blockchain network of the neural consensus proof-based blockchain network system constructing an intelligent safety distribution platform with a IoT (Internet of Things) sensor collection server connected; and providing to a user terminal a real-time monitoring interface configured on the basis of the block creation monitoring statistics data for managing a safety quality and a distribution history of a product distributed through the intelligent safety distribution platform, wherein the neural consensus proof-based block creation process comprises: extracting effectiveness verification data from new block data; obtaining neural consensus designation information of a next block created on the basis of a random consensus proof process in accordance with verification processing of the effectiveness verification data; and creating effectiveness verification data of the next block by selectively driving a consensus node functioning unit on the basis of the neural consensus designation information of the next block.

2. The method of claim 1, wherein the effectiveness verification data include consensus process verification data corresponding to the random consensus proof process, and the neural consensus designation information of the next block include nonce information for verifying a participation qualification of a neural consensus corresponding to the next block.

3. The method of claim 1, wherein the non-random consensus proof-based blockchain network is a Proof of Work (PoW)-type or Proof of stake (Pos)-type blockchain network.

4. The method of claim 1, wherein the real-time monitoring interface includes at least one of node state information, node number information, created block information, standby transaction information, and transaction number-per-hour information that correspond to the neural consensus proof-based blockchain network system configured on the basis of the block creation monitoring statistics data.

5. The method of claim 1, wherein the real-time monitoring system includes information about a consensus participant node participating in the neural consensus proof-based block creation process in correspondence to each block data.

6. The method of claim 1, wherein the real-time monitoring interface includes at least one of block hash information, previous block information, block creation time information, total block creation hash difficulty information, receipt root information, additional data information, nonce information, minor information, individual block creation hash difficulty information, gas limit information, gas use information, size information, and uncle block has information (sha3Uncles), as detailed information of each block data.

7. The method of claim 1, wherein the real-time monitoring interface includes node-specific usage and resource state information of the neural consensus proof-based blockchain network system.

8. An apparatus for providing a service, the apparatus comprising:

a block creation monitoring statistics data collector for collecting block creation monitoring statistics data corresponding to a neural consensus proof-based blockchain network system from a node device which performs a neural consensus proof-based block creation process in accordance with a preset condition while connected to a non-random consensus proof-based blockchain network of the neural consensus proof-based blockchain network system constructing an intelligent safety distribution platform with a IoT (Internet of Things) sensor collection server connected; and a service provider for providing to a user terminal a real-time monitoring interface configured on the basis of the block creation monitoring statistics data for managing a safety quality and a distribution history of a product distributed through the intelligent safety distribution platform, wherein the neural consensus proof-based block creation process comprises: extracting effectiveness verification data from new block data; obtaining neural consensus designation information of a next block created on the basis of a random consensus proof process in accordance with verification processing of the effectiveness verification data; and creating effectiveness verification data of the next block by selectively driving a consensus node functioning unit on the basis of the neural consensus designation information of the next block.

9. The apparatus of claim 8, wherein the real-time monitoring interface includes node information of real-time block-specific consensus participant nodes that is created in accordance with a neural consensus proof process of the neural consensus proof-based blockchain network system.

10. The apparatus of claim 9, wherein the consensus participant node information includes at least one of a list of participant nodes participating in a neural consensus proof process, a committee node list, next chair node information, and a next congress node list, and is output through a display of the user terminal in correspondence to a target block number.

11. The apparatus of claim 10, wherein the consensus participant node information includes node-specific tokenized recognition information and IP address information.

12. The apparatus of claim 9, wherein the real-time monitoring interface includes a graphic interface configuring daily block creation information, total block creation information, and transaction-per-block information into statistics data.

13. The apparatus of claim 9, wherein the neural consensus proof-based blockchain network system includes a neural consensus proof module cluster configured to create a new block combined with random consensus proof-based neural consensus effectiveness verification data using block data propagated from the non-random consensus proof-based blockchain network in accordance with a preset condition, and the new block is propagated through the non-random consensus proof-based blockchain network.

* * * * *